US012230438B2

(12) United States Patent
Yamanaka et al.

(10) Patent No.: US 12,230,438 B2
(45) Date of Patent: Feb. 18, 2025

(54) COMPOUND FOR BONDED MAGNET, BONDED MAGNET, METHOD OF PRODUCING SAME, AND RESIN COMPOSITION FOR BONDED MAGNETS

(71) Applicant: NICHIA CORPORATION, Anan (JP)

(72) Inventors: Satoshi Yamanaka, Tokushima (JP); Takayuki Yano, Tokushima (JP); Shuichi Tada, Komatsushima (JP); Masahiro Abe, Tokushima (JP); Kenta Iwai, Anan (JP)

(73) Assignee: NICHIA CORPORATION, Anan (JP)

( * ) Notice: Subject to any disclaimer, the term of this patent is extended or adjusted under 35 U.S.C. 154(b) by 436 days.

(21) Appl. No.: 17/455,155

(22) Filed: Nov. 16, 2021

(65) Prior Publication Data

US 2022/0157520 A1    May 19, 2022

(30) Foreign Application Priority Data

| Nov. 18, 2020 | (JP) | 2020-191743 |
| Nov. 19, 2020 | (JP) | 2020-192544 |
| Dec. 3, 2020 | (JP) | 2020-201165 |
| Jan. 21, 2021 | (JP) | 2021-008210 |
| Jan. 21, 2021 | (JP) | 2021-008211 |
| Jan. 21, 2021 | (JP) | 2021-008212 |

(51) Int. Cl.
| B29C 45/00 | (2006.01) |
| B29B 7/88 | (2006.01) |
| H01F 1/057 | (2006.01) |
| H01F 41/02 | (2006.01) |
| B29K 77/00 | (2006.01) |
| B29K 505/00 | (2006.01) |

(52) U.S. Cl.
CPC .......... *H01F 41/0253* (2013.01); *B29B 7/88* (2013.01); *B29C 45/0001* (2013.01); *H01F 1/0571* (2013.01); *B29K 2077/00* (2013.01); *B29K 2505/00* (2013.01); *B29K 2995/0008* (2013.01)

(58) Field of Classification Search
None
See application file for complete search history.

(56) References Cited

U.S. PATENT DOCUMENTS

| 5,384,957 A * | 1/1995 | Mohri ................. H01F 41/028 492/8 |
| 5,489,656 A | 2/1996 | Ohtsuka et al. |
| 5,672,663 A | 9/1997 | Ohtsuka et al. |
| 5,905,122 A | 5/1999 | Ohtsuka et al. |
| 5,962,600 A | 10/1999 | Ohtsuka et al. |
| 6,764,607 B1 * | 7/2004 | Ikegami ................. H01F 41/026 148/101 |
| 2003/0041920 A1 | 3/2003 | Hoshi et al. |
| 2005/0145301 A1 | 7/2005 | Honkura |
| 2005/0247376 A1 * | 11/2005 | Chang ..................... B82Y 25/00 148/302 |
| 2006/0113005 A1 | 6/2006 | Ando et al. |
| 2007/0068602 A1 | 3/2007 | Pemberton et al. |
| 2008/0202642 A1 | 8/2008 | Sakamoto et al. |
| 2010/0013585 A1 | 1/2010 | Tamura |
| 2010/0159258 A1 | 6/2010 | Rakiewicz et al. |
| 2010/0245006 A1 | 9/2010 | Menjo et al. |
| 2011/0186181 A1 | 8/2011 | Niinae et al. |
| 2014/0083568 A1 | 3/2014 | Niinae et al. |
| 2015/0228387 A1 | 8/2015 | Urushihara et al. |
| 2019/0224747 A1 * | 7/2019 | Yamanaka ............... B22F 1/102 |
| 2022/0251368 A1 | 8/2022 | Yamanaka |
| 2022/0362843 A1 | 11/2022 | Yamanaka et al. |

FOREIGN PATENT DOCUMENTS

| JP | H01-272662 A | 10/1989 |
| JP | H05152116 A | 6/1993 |
| JP | H06-306272 A | 11/1994 |
| JP | 2000199074 A | 7/2000 |
| JP | 2001181522 A | 7/2001 |
| JP | 2002 043109 A * | 2/2002 |
| JP | 2002075767 A | 3/2002 |
| JP | 2005213619 A | 8/2005 |
| JP | 2005286031 A | 10/2005 |
| JP | 2006183144 A | 7/2006 |
| JP | 2007019419 A | 1/2007 |
| JP | 2007035667 A | 2/2007 |
| JP | 2007273831 A | 10/2007 |
| JP | 2010232468 A | 10/2010 |
| JP | 2014160794 A | 9/2014 |
| JP | 2017043804 A | 3/2017 |
| JP | 2017210662 A | 11/2017 |
| JP | 2020056101 A | 4/2020 |
| JP | 6780693 B2 | 11/2020 |
| JP | 7518397 B2 | 7/2024 |
| WO | 2002006562 A1 | 1/2002 |

(Continued)

*Primary Examiner* — Mohammad M Ameen
(74) *Attorney, Agent, or Firm* — Hunton Andrews Kurth LLP

(57) ABSTRACT

A method of producing a compound for bonded magnets, the method including: heat-curing a thermosetting resin and a curing agent having a ratio of the number of reactive groups of the curing agent to the number of reactive groups of the thermosetting resin of at least 2 but not higher than 11 to obtain an additive for bonded magnets; and kneading the additive for bonded magnets, magnetic powder, and a thermoplastic resin to obtain a compound for bonded magnets in which a filling ratio of the magnetic powder is at least 91.5% by mass.

17 Claims, No Drawings

(56) References Cited

FOREIGN PATENT DOCUMENTS

| WO | 03085684 A1 | 10/2003 |
|----|-------------|---------|
| WO | 2008146368 A1 | 12/2008 |
| WO | 2010001878 A2 | 1/2010 |
| WO | 2014013914 A1 | 1/2014 |
| WO | 2021014837 A1 | 1/2021 |

* cited by examiner

COMPOUND FOR BONDED MAGNET, BONDED MAGNET, METHOD OF PRODUCING SAME, AND RESIN COMPOSITION FOR BONDED MAGNETS

CROSS-REFERENCE TO RELATED PATENT APPLICATION

This application claims priority to Japanese Patent Application No. 2020-191743 filed on Nov. 18, 2020, Japanese Patent Application No. 2020-192544 filed on Nov. 19, 2020, Japanese Patent Application No. 2020-201165 filed on Dec. 3, 2020, Japanese Patent Application No. 2021-008210 filed on Jan. 21, 2021, Japanese Patent Application No. 2021-008211 filed on Jan. 21, 2021, and Japanese Patent Application No. 2021-008212 filed on Jan. 21, 2021. The disclosures of Japanese Patent Application No. 2020-191743, Japanese Patent Application No. 2020-192544, Japanese Patent Application No. 2020-201165, Japanese Patent Application No. 2021-008210, Japanese Patent Application No. 2021-008211, and Japanese Patent Application No. 2021-008212 are hereby incorporated by reference in their entirety.

BACKGROUND

The present invention relates to compounds for bonded magnets, bonded magnets, method of producing compounds for bonded magnets, method of producing bonded magnets, and resin composition for bonded magnets.

JP 2017-43804 A discloses a method of producing a bonded magnet by melt-kneading a thermoplastic resin with SmFeN particles to prepare a compound, and injection-molding the compound.

JP 2010-232468 A discloses a bonded magnet including NdFeB magnetic powder, an epoxy resin, and an amine-based curing agent for curing the epoxy resin.

Moreover, SmFeN-based anisotropic magnetic powder is known to have higher coercive force when their surfaces are coated with phosphates. For example, JP 2020-056101 A discloses a method of adding a pH-adjusted phosphate treatment liquid containing an orthophosphoric acid to a slurry containing SmFeN-based anisotropic magnetic powder and water as a solvent to coat a surface of the SmFeN-based anisotropic magnetic powder with the phosphate.

JP 2017-210662 A discloses a method of adding a pH-adjusted phosphate treatment liquid to a slurry containing SmFeN-based anisotropic magnetic powder having a large particle size and an organic solvent, and then milling the SmFeN-based anisotropic magnetic powder to control the particle size of the SmFeN-based anisotropic magnetic powder while coating the surface of the powder with the phosphate.

JP 2014-160794 A discloses that oxidation of a phosphate-coated SmFeN-based anisotropic magnetic powder increases the coercive force of the phosphate-coated SmFeN-based anisotropic magnetic powder.

SUMMARY

Embodiments of the present disclosure aim to provide compounds for bonded magnets which make it possible to improve the fluidity of thermoplastic resin-containing compounds for bonded magnets and highly fill the compounds with magnetic powder, as well as bonded magnets with enhanced magnetic properties.

Exemplary embodiments of the present disclosure relate to a method of producing a compound for bonded magnets, the method including: heat-curing a thermosetting resin and a curing agent having a ratio of a number of reactive groups of the curing agent to a number of reactive groups of the thermosetting resin of at least 2 but not higher than 11 to obtain an additive for bonded magnets; and kneading the additive for bonded magnets, magnetic powder, and a thermoplastic resin to obtain a compound for bonded magnets in which a filling ratio of the magnetic powder is at least 91.5% by mass.

Exemplary embodiments of the present disclosure relate to a method of producing a compound for bonded magnets, the method including: heat-curing a thermosetting resin and a curing agent having a ratio of a number of reactive groups of the curing agent to a number of reactive groups of the thermosetting resin of at least 2 but not higher than 11 to obtain an additive for bonded magnets; and kneading the additive for bonded magnets, magnetic powder, and a thermoplastic resin to obtain a compound for bonded magnets, the magnetic powder including NdFeB-based magnetic powder and SmFeN-based anisotropic magnetic powder.

Exemplary embodiments of the present disclosure relate to a method of producing a compound for bonded magnets, the method including: heat-curing a thermosetting resin and a curing agent having a ratio of a number of reactive groups of the curing agent to a number of reactive groups of the thermosetting resin of at least 2 but not higher than 11 to obtain an additive for bonded magnets; and kneading the additive for bonded magnets, magnetic powder, and a thermoplastic resin to obtain a compound for bonded magnets, the magnetic powder including SmFeN-based anisotropic magnetic powder having a surface coated with a phosphate.

Exemplary embodiments of the present disclosure relate to a method of producing a compound for bonded magnets, the method including: heat curing a thermosetting resin and a curing agent having a ratio of a number of reactive groups of the curing agent to a number of reactive groups of the thermosetting resin of at least 2 but not higher than 11 to obtain an additive for bonded magnets; kneading the additive for bonded magnets and a thermoplastic resin to obtain a resin composition for bonded magnets; and kneading the resin composition for bonded magnets and magnetic powder to obtain a compound for bonded magnets.

Exemplary embodiments of the present disclosure relate to a method of producing a bonded magnet, the method including: heat-curing a thermosetting resin and a curing agent having a ratio of a number of reactive groups of the curing agent to a number of reactive groups of the thermosetting resin of at least 2 but not higher than 11 to obtain an additive for bonded magnets; kneading the additive for bonded magnets, magnetic powder, and a thermoplastic resin to obtain a compound for bonded magnets in which a filling ratio of the magnetic powder is at least 91.5% by mass; and injection-molding the compound for bonded magnets.

Exemplary embodiments of the present disclosure relate to a method of producing a bonded magnet, the method including: heat-curing a thermosetting resin and a curing agent having a ratio of a number of reactive groups of the curing agent to a number of reactive groups of the thermosetting resin of at least 2 but not higher than 11 to obtain an additive for bonded magnets; kneading the additive for bonded magnets, magnetic powder, and a thermoplastic resin to obtain a compound for bonded magnets; and injection-molding the compound for bonded magnets, the magnetic powder including NdFeB-based magnetic powder and SmFeN-based anisotropic magnetic powder.

Exemplary embodiments of the present disclosure relate to a method of producing a bonded magnet, the method including: heat-curing a thermosetting resin and a curing agent having a ratio of a number of reactive groups of the curing agent to a number of reactive groups of the thermosetting resin of at least 2 but not higher than 11 to obtain an additive for bonded magnets; kneading the additive for bonded magnets, magnetic powder, and a thermoplastic resin to obtain a compound for bonded magnets; and injection-molding the compound for bonded magnets, the magnetic powder including SmFeN-based anisotropic magnetic powder having a surface coated with a phosphate.

Exemplary embodiments of the present disclosure relate to a method of producing a bonded magnet, the method including: heat curing a thermosetting resin and a curing agent having a ratio of a number of reactive groups of the curing agent to a number of reactive groups of the thermosetting resin of at least 2 but not higher than 11 to obtain an additive for bonded magnets; kneading the additive for bonded magnets and a thermoplastic resin to obtain a resin composition for bonded magnets; kneading the resin composition for bonded magnets and magnetic powder to obtain a compound for bonded magnets; and injection-molding the compound for bonded magnets.

Exemplary embodiments of the present disclosure relate to a resin composition for bonded magnets, containing a melt-kneaded mixture of a thermoplastic resin with a cured product of a thermosetting resin and a curing agent having a ratio of a number of reactive groups of the curing agent to a number of reactive groups of the thermosetting resin of at least 2 but not higher than 11.

According to the above embodiments, it is possible to improve the fluidity of thermoplastic resin-containing compounds for bonded magnets and highly fill the compounds with magnetic powder, thereby providing bonded magnets with enhanced magnetic properties.

DETAILED DESCRIPTION

Embodiments of the present disclosure are described in detail below. The following embodiments, however, are intended as examples to embody the technical idea of the present invention and are not intended to limit the scope of the present invention to the following embodiments. As used herein, the term "step" encompasses not only an independent step but also a step that may not be clearly distinguished from other steps, as long as a desired object of the step is achieved.

A method of producing a first compound for bonded magnets according to embodiments of the present disclosure includes: heat curing a thermosetting resin and a curing agent having a ratio of the number of reactive groups of the curing agent to the number of reactive groups of the thermosetting resin of at least 2 but not higher than 11 to obtain an additive for bonded magnets; and kneading the additive for bonded magnets, magnetic powder, and a thermoplastic resin to obtain a compound for bonded magnets in which a filling ratio of the magnetic powder is at least 91.5% by mass.

In the production of a bonded magnet containing a thermoplastic resin, when a kneaded mixture of the thermoplastic resin and a thermosetting resin is injection-molded, the reactive groups of the thermosetting resin (for example, glycidyl groups of an epoxy resin) may react with the reactive groups of the thermoplastic resin (for example, amide groups of nylon 12), thereby decreasing the fluidity of the resin and deteriorating the moldability. In the cured product of a thermosetting resin and a curing agent at a ratio of the equivalent weight of the curing agent to the equivalent weight of the thermosetting resin of at least 2 but not higher than 11 according to the present embodiment, the reactive groups of the thermosetting resin sufficiently deactivated by the reactive group of the curing agent (for example, amino groups of diaminodiphenyl sulfone (DDS)) are less likely to react with the reactive groups of the thermoplastic resin, so that the decrease in the fluidity of the resin can be suppressed. Such a cured product can be used as an additive for thermoplastic resin-containing bonded magnets. Moreover, when a compound for bonded magnets prepared from the additive for thermoplastic resin-containing bonded magnets according to the present embodiment is injection-molded to form a bonded magnet, this allows the use of a reduced injection pressure and therefore the bonded magnet has enhanced magnetic properties.

Any thermosetting resin that can be cured by heat may be used. Examples include epoxy resins, phenolic resins, urea resins, melamine resins, guanamine resins, unsaturated polyester resins, vinyl ester resins, diallyl phthalate resins, polyurethane resins, silicone resins, polyimide resins, alkyd resins, furan resins, dicyclopentadiene resins, acrylic resins, and allyl carbonate resins. In view of mechanical properties and heat resistance, epoxy resins are preferred among these. The thermosetting resin is preferably a liquid at room temperature or a solid that can be dissolved in a solvent to become liquid. Moreover, when it is an epoxy resin, it is preferred in view of reactivity with the curing agent to select an epoxy resin that has a crystal structure with a rigid backbone and less steric hindrance, a small molecular weight, and high fluidity, such as for example a biphenyl epoxy resin, bisphenol A epoxy resin, naphthalene epoxy resin, or anthracene epoxy resin. Examples of usable epoxy resins include jER-YX4000, jER-828, jER-YX8800, jER-YL6121HA, and jER-YL6677 (all available from Mitsubishi Chemical Corporation), EPICLON-HP-4032D, HP-7200L, HP-7200, HP-7200H, HP-7200HH, HP-7200HHH HP-4700, HP-4770, HP-5000, HP-6000, and HP-4710 (all available from DIC Corporation), and YDC-1312, YSLV-70XY, and YSLV-80XY (all available from NIPPON STEEL Chemical & Material Co., Ltd.).

Any curing agent capable of heat curing a selected thermosetting resin may be used. When the thermosetting resin is an epoxy resin, examples of the curing agent include amine-based curing agents, acid anhydride-based curing agents, polyamide-based curing agents, imidazole-based curing agents, phenolic resin-based curing agents, polymercaptan resin-based curing agents, polysulfide resin-based curing agents, and organic acid hydrazide-based curing agents. Examples of the amine-based curing agents include diaminodiphenyl sulfone, meta-phenylenediamine, diaminodiphenylmethane, diethylenetriamine, and triethylenetetramine.

When the thermoplastic resin is a nylon resin and the thermosetting resin is an epoxy resin, the curing agent is preferably a diamine-based curing agent having an aromatic backbone. It is believed that the diamine-based curing agent having an aromatic backbone has a chemical structure with less steric hindrance around the reactive amino groups due to the presence of the aromatic backbone, and thus is highly reactive with the reactive glycidyl groups of the epoxy resin; moreover, the amino groups have a high affinity for the reactive amide groups of the nylon resin and thus improve the fluidity of the nylon resin. Examples of such curing agents include the aforementioned diaminodiphenyl sulfone, meta-phenylenediamine, and diaminodiphenylmethane, as well as 9,9-bis(4-amino-3-methylphenyl)fluorene, bisaniline P, bisaniline M, benzoguanamine, 3,3'-dinitrobenzidine, 4,4'-methylenebis(2-ethyl-6-methylaniline), o-tolidine, bis [4-(4-aminophenoxy)phenyl]sulfone, bis[4-(3-aminophenoxy)phenyl]sulfone, 1,3-phenylenediamine, 2,2'-bis(trifluoromethyl)benzidine, 4,4'-diaminodiphenylmethane, 3,3'-sulfonyldianiline, 4,4'-diaminodiphenylether, and 1,3-bis(3-aminophenoxy)benzene.

The amount of the curing agent is adjusted as a ratio of the number of reactive groups of the curing agent to the number of reactive groups of the thermosetting resin (a ratio of the equivalent weight of the curing agent to the equivalent weight of the thermosetting resin). The ratio of the number of reactive groups of the curing agent to the number of reactive groups of the thermosetting resin is at least 2 but not higher than 11, preferably at least 2 but not higher than 10, more preferably at least 2 but not higher than 7. Moreover, the lower limit of the ratio of the number of reactive groups is preferably higher than 2.5, more preferably at least 3. When the ratio is higher than 11, the mechanical properties of the bonded magnet may decrease. When the ratio is lower than 2, the ratio of the number of reactive groups of the curing agent to the number of reactive groups of the thermosetting resin may be so small that some reactive groups of the thermosetting resin remain unreacted. Therefore, in a subsequent step of kneading with the thermoplastic resin, the remaining reactive groups of the thermosetting resin may react with the reactive groups of the thermoplastic resin so that a viscosity increase can occur during injection-molding. As a result, the moldability into a bonded magnet and the mechanical properties of the molded article can be deteriorated as compared with when the thermoplastic resin is used alone. Herein, the equivalent weight of the thermosetting resin means the number of grams of resin containing one equivalent of reactive groups and, when the thermosetting resin is an epoxy resin, for example, it corresponds to the epoxy equivalent weight of the resin, while the equivalent weight of the curing agent means the active hydrogen equivalent weight.

The cured product may be obtained by incorporating the curing agent into the thermosetting resin and heat curing the mixture. The heat curing temperature may be selected according to the properties of the thermosetting resin used. In view of curability, the heat curing temperature is preferably at least 60° C. but not higher than 250° C., more preferably at least 180° C. but not higher than 220° C.

The cured product may optionally be milled. The cured product may be milled by any method, such as milling with a sample mill, a ball mill, a stamp mill, a mortar, or a mixer. The milled product may optionally be classified with a sieve or other devices. In view of the compatibility with the thermoplastic resin, the milled product preferably has an average particle size of not more than 1,000 μm, more preferably not more than 500 μm.

The additive for bonded magnets may also be obtained by incorporating a curing accelerator with the thermosetting resin and the curing agent, and curing the mixture. Examples of the curing accelerator include 1,8-diazabicyclo[5.4.0] undecene-7, 1,5-diazabicyclo[4.3.0]nonene-5, 1-cyanoethyl-2-ethyl-4-methylimidazole, 2-methyl-4-methylimidazole, triphenylphosphine, and sulfonium salts. The amount of the curing accelerator is not limited, but usually the curing accelerator is added in an amount of at least 0.01% by mass but not more than 10% by mass relative to the combined amount of the thermosetting resin and the curing agent.

In the kneading step, the additive for bonded magnets, the magnetic powder, and the thermoplastic resin may be melt-kneaded to prepare a compound for bonded magnets to be injection-molded. Any melt-kneader may be used, including single screw kneaders, twin screw kneaders, mixing rolls, kneaders, Banbury mixers, intermeshing twin screw extruders, and non-intermeshing twin screw extruders. The melt-kneading temperature is not limited, and may be selected depending on the properties of the thermoplastic resin used. The temperature is preferably at least 180° C. but not higher than 250° C.

The thermoplastic resin may be any injection-moldable resin. Examples include nylon resins (polyamides); polyolefins such as polypropylene (PP) and polyethylene (PE); polyesters; polycarbonates (PC); polyphenylene sulfides (PPS); polyether ether ketones (PEEK); polyacetals (POM); and liquid crystal polymers (LCP). Examples of the nylon resins include polylactams such as nylon 6, nylon 11, and nylon 12; condensates of dicarboxylic acids and diamines such as nylon 6,6, nylon 6,10, and nylon 6,12; polyamide copolymers such as nylon 6/6,6, nylon 6/6,10, nylon 6/12, nylon 6/6,12, nylon 6/6,10/6.10, nylon 6/6,6/6,12, and nylon-6/polyether; nylon 6T, nylon 9T, nylon MXD6, aromatic nylons, and amorphous nylons. To balance low water absorption with moldability and mechanical properties, nylon resins are preferred among these, with nylon 12 being particularly preferred.

Any magnetic powder may be used. Examples include SmFeN-based, NdFeB-based, and SmCo-based rare earth magnetic powders. In view of heat resistance and the absence of rare metals, SmFeN-based magnetic powder is preferred among these. SmFeN-based magnetic powder may be a nitride having a $Th_2Zn_{17}$-type crystal structure and containing the rare earth metal samarium (Sm), iron (Fe), and nitrogen (N) as represented by the general formula: $Sm_xFe_{100-x-y}N_y$, preferably wherein x is at least 8.1 at % but not more than 10 at %; y is at least 13.5 at % but not more than 13.9 at %; and the balance is mainly Fe.

SmFeN-based magnetic powder may be produced by a method disclosed in JP H11-189811 A. NdFeB-based magnetic powder may be produced by a HDDR method disclosed in WO 2003/85147. SmCo-based magnetic powder may be produced by a method disclosed in JP H08-260083 A. Moreover, the magnetic powder may be surface-treated with a silane coupling agent by, for example, a method disclosed in JP 2017-43804 A.

The average particle size of the magnetic powder is preferably not more than 10 μm, more preferably not more than 6 μm, still more preferably not more than 4 μm. Herein, the average particle size is defined as the particle size corresponding to the 50th percentile of the cumulative undersize particle size distribution by volume. In view of demagnetization squareness, the magnet powder for use in a compound for bonded magnets preferably has a monodisperse particle size distribution.

The magnetic powder may be surface-treated with a silane coupling agent. The surface treatment with a silane coupling agent or the like increases binding between the magnetic powder and the resins, thereby reducing a viscosity increase during injection-molding.

The silane coupling agent is preferably a compound represented by the formula: $X-Si-(OR)_n$ wherein X represents an alkyl group having a polar group at the end; R represents a C1-C3 alkyl group; and n represents an integer of at least 1 but not more than 3, provided that the polar group in X has an amino group, a ureido group, an epoxy group, a thiol group, or a methacryloxy group. When the thermoplastic resin used is a nylon resin, the silane coupling agent is preferably one having an amino group with high affinity for the nylon resin, particularly preferably 3-aminopropyltrimethoxysilane, 3-aminopropyltriethoxysilane, 3-(2-aminoethyl)aminopropyltrimethoxysilane, or 3-(2-aminoethyl)aminopropylmethyltriethoxysilane.

In the method of producing a first compound for bonded magnets according to the present embodiment, the compound for bonded magnets is filled with the magnetic powder at a filling ratio of at least 91.5% by mass, preferably at least 91.8% by mass, more preferably at least 92.2% by mass. The upper limit of the filling ratio is not limited, but it is preferably not higher than 93.2% by mass, more preferably not higher than 92.8% by mass, still more preferably not higher than 92.5% by mass. When the filling ratio is higher than 93.2% by mass, the viscosity during injection-molding may become higher, resulting in a decrease in moldability.

The amount of the additive for bonded magnets in the first compound for bonded magnets according to the present embodiment is preferably at least 0.5% by mass but not more than 4.2% by mass, more preferably at least 0.9% by mass but not more than 3.5% by mass, still more preferably at least 0.9% by mass but not more than 1.2% by mass. When the amount of the additive for bonded magnets is more than 4.2% by mass, the remanence of the bonded magnet may decrease. When the amount is less than 0.5% by mass, the viscosity during injection-molding may become higher, resulting in a decrease in moldability.

The amount of the thermoplastic resin in the first compound for bonded magnets according to the present embodiment is preferably not more than 8.0% by mass, more preferably not more than 6.5% by mass. The lower limit is not limited, but it is preferably at least 4.2% by mass, more preferably at least 5.5% by mass. When the amount of the thermoplastic resin added is more than 8.0% by mass, the remanence of the bonded magnet may decrease. When the amount is less than 4.2% by mass, the viscosity during injection-molding may become higher, resulting in a decrease in moldability.

In the first compound for bonded magnets according to the present embodiment, the amount of the additive for bonded magnets per 100 parts by mass of the magnetic powder is preferably at least 0.54 parts by mass but not more than 4.6 parts by mass, more preferably at least 0.95 parts by mass but not more than 4 parts by mass, still more preferably at least 0.97 parts by mass but not more than 1.31 parts by mass. When the amount of the additive for bonded magnets is more than 4.6 parts by mass, the remanence of the bonded magnet may decrease. When the amount is less than 0.54 parts by mass, the viscosity during injection-molding may become higher, resulting in a decrease in moldability.

In the first compound for bonded magnets according to the present embodiment, the amount of the thermoplastic resin per 100 parts by mass of the magnetic powder is preferably at least 4.5 parts by mass but not more than 9 parts by mass, more preferably at least 6 parts by mass but not more than 7 parts by mass. When the amount of the thermoplastic resin is more than 9 parts by mass, the remanence of the bonded magnet may decrease. When the amount is less than 4.5 parts by mass, the viscosity during injection-molding may become higher, resulting in a decrease in moldability.

The first compound for bonded magnets according to the present embodiment may contain an organic pigment. The compound for bonded magnets containing an organic pigment can be used to change the body color of the bonded magnet, as compared with the compound for bonded magnets containing no organic pigment. Examples of the organic pigment include polycyclic pigments, such as phthalocyanine pigments and quinacridone pigments, azo pigments, and lake pigments. Preferred among these are those having resistance to heat at a temperature of at least 250° C.

The first compound for bonded magnets according to the present embodiment containing an organic pigment may be prepared, for example, by adding the organic pigment during the kneading step. The amount of the organic pigment in the first compound for bonded magnets is preferably not more than 0.6% by mass, more preferably not more than 0.55% by mass. The lower limit is not limited, but it is preferably at least 0.05% by mass, more preferably at least 0.1% by mass. When the amount of the organic pigment is more than 0.6% by mass, the viscosity during injection-molding tends to become higher, resulting in a decrease in moldability. When the amount is less than 0.05% by mass, a smaller difference in body color may be provided as compared with when using the compound for bonded magnets containing no organic pigment.

A method of producing a second compound for bonded magnets according to embodiments of the present disclosure includes:

heat curing a thermosetting resin and a curing agent having a ratio of the number of reactive groups of the curing agent to the number of reactive groups of the thermosetting resin of at least 2 but not higher than 11 to obtain an additive for bonded magnets; and kneading the additive for bonded magnets, magnetic powder, and a thermoplastic resin to obtain a compound for bonded magnets, the magnetic powder including NdFeB-based magnetic powder and SmFeN-based anisotropic magnetic powder.

The magnetic powder includes NdFeB-based magnetic powder and SmFeN-based anisotropic magnetic powder. The SmFeN-based anisotropic magnetic powder may be a nitride having a $Th_2Zn_{17}$-type crystal structure and containing the rare earth metal samarium (Sm), iron (Fe), and nitrogen (N) as represented by the general formula: $Sm_xFe_{100-x-y}N_y$, preferably wherein x is at least 8.1 at % but not more than 10 at %; y is at least 13.5 at % but not more than 13.9 at %; and the balance is mainly Fe. In view of demagnetization squareness, the magnetic powder preferably has a monodisperse particle size distribution. The SmFeN-based anisotropic magnetic powder may be produced by a method disclosed in JP H11-189811 A.

The NdFeB-based magnetic powder may be produced by a HDDR method disclosed in WO 2003/85147. The NdFeB-based magnetic powder preferably has an average particle size of at least 40 μm but not more than 200 μm.

The magnetic powder may further contain SmCo-based magnetic powder in addition to the NdFeB-based magnetic powder and the SmFeN-based anisotropic magnetic powder. The SmCo-based magnetic powder may be produced by a method disclosed in JP H08-260083 A and may suitably have an average particle size of at least 10 μm but not more than 30 μm.

The magnetic powder may optionally be subjected to a phosphate treatment. A phosphate treatment agent may basically be dissolved in water or an organic solvent such as isopropanol to prepare a phosphate bath to which may optionally be added a reaction accelerator such as nitrate ions or a grain refining agent such as V ions, Cr ions, or Mo ions, and the magnetic powder may be introduced into the bath to form a passive film having a P—O bond on the surface of the magnetic powder. Examples of the phosphate treatment agent include orthophosphoric acid, sodium dihydrogen phosphate, ammonium dihydrogen phosphate, diammonium hydrogen phosphate, zinc phosphate, calcium phosphate, and other phosphates, hypophosphorous acid and hypophosphites, pyrophosphoric acid, polyphosphoric acid, and other inorganic phosphoric acids, and organic phosphoric acids, and salts thereof.

Silica Treatment Step

The magnetic powder may optionally be subjected to a silica treatment. Formation of a silica thin film on the magnetic powder enhances oxidation resistance. The silica thin film may be formed, for example, by mixing an alkyl silicate, phosphate-coated magnetic powder, and an alkali solution.

Silane Coupling Treatment Step

The magnetic powder obtained after the silica treatment may be further treated with a silane coupling agent. When the magnetic powder with a silica thin film formed thereon is subjected to a silane coupling treatment, a coupling agent film is formed on the silica thin film, which improves the magnetic properties of the magnetic powder as well as wettability between the magnetic powder and the resin and magnet strength. Any silane coupling agent may be used and may be selected depending on the type of resin. Examples of the silane coupling agent include 3-aminopropyltriethoxysilane, γ-(2-aminoethyl)aminopropyltrimethoxysilane, γ-(2-aminoethyl)aminopropylmethyldimethoxysilane, γ-methacryloxypropyltrimethoxysilane, γ-methacryloxypropylmethyldimethoxysilane, N-β-(N-vinylbenzylaminoethyl)-γ-aminopropyltrimethoxysilane hydrochloride, γ-glycidoxypropyltrimethoxysilane, γ-mercaptopropyltrimethoxysilane, methyltrimethoxysilane, methyltriethoxysilane, vinyltriacetoxysilane, γ-chloropropyltrimethoxysilane, hexamethylenedisilazane, γ-anilinopropyltrimethoxysilane, vinyltrimethoxysilane, octadecyl[3-(trimethoxysilyl)propyl]ammonium chloride, γ-chloropropylmethyldimethoxysilane, γ-mercaptopropylmethyldimethoxysilane, methyltrichlorosilane, dimethyldichlorosilane, trimethylchlorosilane, vinyltrichlorosilane, vinyltris(β-methoxyethoxy)silane, vinyltriethoxysilane, β-(3,4-epoxycyclohexyl)ethyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, ureidopropyltriethoxysilane, γ-isocyanatopropyltriethoxysilane, polyethoxydimethylsiloxane, polyethoxymethylsiloxane, bis(t-rimethoxysilylpropyl)amine, bis(3-triethoxysilylpropyl)tetrasulfane, γ-isocyanatopropyltrimethoxysilane, vinylmethyldimethoxysilane, 1,3,5-N-tris(3-trimethoxysilylpropyl)isocyanurate, t-butyl carbamate trialkoxysilane, and N-(1,3-dimethylbutylidene)-3-(triethoxysilyl)-1-propaneamine. These silane coupling agents may be used alone, or two or more of them may be used in combination. The amount of the silane coupling agent added per 100 parts by mass of the magnetic powder is preferably at least 0.2 parts by mass but not more than 0.8 parts by mass, more preferably at least 0.25 parts by mass but not more than 0.6 parts by mass. When the amount is less than 0.2 parts by mass, the effect of the silane coupling agent tends to be small. When the amount is more than 0.8 parts by mass, the magnetic properties of the magnetic powder or magnet tend to decrease due to aggregation of the magnetic powder.

The magnetic powder obtained after the silica treatment or silane coupling treatment may be filtered, dehydrated, and dried in a usual manner.

In the method of producing a second compound for bonded magnets according to the present embodiment, the compound for bonded magnets is preferably filled with the magnetic powder at a filling ratio of at least 75% by mass but not higher than 96% by mass, more preferably at least 90% by mass but not higher than 95.5% by mass. When the filling ratio is higher than 96% by mass, the viscosity during injection-molding may become higher, resulting in a decrease in moldability. When the filling ratio is less than 75% by mass, the remanence of the bonded magnet may decrease.

In the method of producing a second compound for bonded magnets according to the present embodiment, the ratio by mass of the NdFeB-based magnetic powder to the SmFeN-based anisotropic magnetic powder may be, for example, at least 0.05 but not higher than 5, preferably at least 0.1 but not higher than 4.5, more preferably at least 0.2 but not higher than 4. When the ratio is lower than 0.05, the viscosity during injection-molding may become higher, resulting in a decrease in moldability. When the ratio is higher than 5, the remanence of the bonded magnet may decrease.

The amount of the additive for bonded magnets in the second compound for bonded magnets according to the present embodiment is preferably at least 0.1% by mass but not more than 4.2% by mass, more preferably at least 0.3% by mass but not more than 3.5% by mass, still more preferably at least 0.5% by mass but not more than 1.2% by mass. When the amount of the additive for bonded magnets is more than 4.2% by mass, the remanence of the bonded magnet may decrease. When the amount is less than 0.1% by mass, the viscosity during injection-molding may become higher, resulting in a decrease in moldability.

The amount of the thermoplastic resin in the second compound for bonded magnets according to the present embodiment is preferably at least 2.5% by mass but not more than 25% by mass, more preferably at least 3.5% by mass but not more than 10% by mass. When the amount of the thermoplastic resin is more than 25% by mass, the remanence of the bonded magnet may decrease. When the amount is less than 2.5% by mass, the viscosity during injection-molding may become higher, resulting in a decrease in moldability.

In the second compound for bonded magnets according to the present embodiment, the amount of the additive for bonded magnets per 100 parts by mass of the magnetic powder is preferably at least 0.1 parts by mass but not more than 5.6 parts by mass, more preferably at least 0.31 parts by mass but not more than 4.67 parts by mass, still more preferably at least 0.52 parts by mass but not more than 1.6 parts by mass. When the amount of the additive for bonded magnets is more than 5.6 parts by mass, the remanence of the bonded magnet may decrease. When the amount is less than 0.1 parts by mass, the viscosity during injection-molding may become higher, resulting in a decrease in moldability.

In the second compound for bonded magnets according to the present embodiment, the amount of the thermoplastic resin per 100 parts by mass of the magnetic powder is preferably at least 2.6 parts by mass but not more than 33 parts by mass, more preferably at least 3.6 parts by mass but not more than 14 parts by mass. When the amount of the thermoplastic resin is more than 33 parts by mass, the remanence of the bonded magnet may decrease. When the amount is less than 2.6 parts by mass, the viscosity during injection-molding may become higher, resulting in a decrease in moldability.

The type and amount of the thermosetting resin, the type and amount of the curing agent, the type and amount of the thermoplastic resin, the curing conditions, and the kneading conditions are as described for the method of producing a first compound for bonded magnets according to the above embodiments.

A method of producing a third compound for bonded magnets according to embodiments of the present disclosure includes:

heat curing a thermosetting resin and a curing agent having a ratio of the number of reactive groups of the curing agent to the number of reactive groups of the thermosetting resin of at least 2 but not higher than 11 to obtain an additive for bonded magnets; and kneading the additive for bonded magnets, magnetic powder, and a thermoplastic resin to obtain a compound for bonded magnets, the magnetic powder including SmFeN-based anisotropic magnetic powder having a surface coated with a phosphate.

The magnetic powder includes SmFeN-based anisotropic magnetic powder having a surface coated with a phosphate. The SmFeN-based anisotropic magnetic powder may be a nitride having a $Th_2Zn_{17}$-type crystal structure and containing the rare earth metal samarium (Sm), iron (Fe), and nitrogen (N) as represented by the general formula: $Sm_xFe_{100-x-y}N_y$, preferably wherein x is at least 8.1 at % but not more than 10 at %; y is at least 13.5 at % but not more than 13.9 at %; and the balance is mainly Fe. In view of demagnetization squareness, the magnetic powder preferably has a monodisperse particle size distribution. The method of forming a phosphate coating on a surface of SmFeN-based anisotropic magnetic powder will be described later.

The magnetic powder may include rare earth magnetic powder such as NdFeB-based or SmCo-based magnetic powder in addition to the SmFeN-based anisotropic magnetic powder. The SmFeN-based anisotropic magnetic powder may be produced by a method disclosed in JP H11-189811 A. The NdFeB-based magnetic powder may be produced by a HDDR method disclosed in WO 2003/85147. The SmCo-based magnetic powder may be produced by a method disclosed in JP H08-260083 A.

The magnetic powder other than the SmFeN-based anisotropic magnetic powder may optionally be subjected to a phosphate treatment. A phosphate treatment agent may basically be dissolved in water or an organic solvent such as isopropanol to prepare a phosphate bath to which may optionally be added a reaction accelerator such as nitrate ions or a grain refining agent such as V ions. Cr ions, or Mo ions, and the magnetic powder may be introduced into the bath to form a passive film having a P—O bond on the surface of the magnetic powder. Examples of the phosphate treatment agent include orthophosphoric acid, sodium dihydrogen phosphate, ammonium dihydrogen phosphate, diammonium hydrogen phosphate, zinc phosphate, calcium phosphate, and other phosphates, hypophosphorous acid and hypophosphites, pyrophosphoric acid, polyphosphoric acid, and other inorganic phosphoric acids, and organic phosphoric acids, and salts thereof.

In the method of producing a third compound for bonded magnets according to the present embodiment, the compound for bonded magnets is preferably filled with the magnetic powder at a filling ratio of at least 75% by mass but not higher than 96% by mass, more preferably at least 90% by mass but not higher than 95.5% by mass. When the filling ratio is higher than 96% by mass, the viscosity during injection-molding may become higher, resulting in a decrease in moldability. When the filling ratio is less than 75% by mass, the remanence of the bonded magnet may decrease.

The amount of the additive for bonded magnets in the third compound for bonded magnets according to the present embodiment is preferably at least 0.1% by mass but not more than 4.2% by mass, more preferably at least 0.3% by mass but not more than 3.5% by mass, still more preferably at least 0.5% by mass but not more than 1.2% by mass. When the amount of the additive for bonded magnets is more than 4.2% by mass, the remanence of the bonded magnet may decrease. When the amount is less than 0.1% by mass, the viscosity during injection-molding may become higher, resulting in a decrease in moldability.

The amount of the thermoplastic resin in the third compound for bonded magnets according to the present embodiment is preferably at least 2.5% by mass but not more than 25% by mass, more preferably at least 3.5% by mass but not more than 10% by mass. When the amount of the thermoplastic resin is more than 25% by mass, the remanence of the bonded magnet may decrease. When the amount is less than 2.5% by mass, the viscosity during injection-molding may become higher, resulting in a decrease in moldability.

In the third compound for bonded magnets according to the present embodiment, the amount of the additive for bonded magnets per 100 parts by mass of the magnetic powder is preferably at least 0.1 parts by mass but not more than 5.6 parts by mass, more preferably at least 0.31 parts by mass but not more than 4.67 parts by mass, still more preferably at least 0.52 parts by mass but not more than 1.6 parts by mass. When the amount of the additive for bonded magnets is more than 5.6 parts by mass, the remanence of the bonded magnet may decrease. When the amount is less than 0.1 parts by mass, the viscosity during injection-molding may become higher, resulting in a decrease in moldability.

In the third compound for bonded magnets according to the present embodiment, the amount of the thermoplastic resin per 100 parts by mass of the magnetic powder is preferably at least 2.6 parts by mass but not more than 33 parts by mass, more preferably at least 3.6 parts by mass but not more than 14 parts by mass. When the amount of the thermoplastic resin is more than 33 parts by mass, the remanence of the bonded magnet may decrease. When the amount is less than 2.6 parts by mass, the viscosity during injection-molding may become higher, resulting in a decrease in moldability.

The type and amount of the thermosetting resin, the type and amount of the curing agent, the type and amount of the thermoplastic resin, the curing conditions, and the kneading conditions are as described for the method of producing a first compound for bonded magnets according to the above embodiments. The silica treatment step and silane coupling treatment step of the magnetic powder are as described for the method of producing a second compound for bonded magnets according to the above embodiments.

A method of producing a fourth compound for bonded magnets according to embodiments of the present disclosure includes:

heat curing a thermosetting resin and a curing agent having a ratio of the number of reactive groups of the curing agent to the number of reactive groups of the thermosetting resin of at least 2 but not higher than 11 to obtain an additive for bonded magnets:

kneading the additive for bonded magnets and a thermoplastic resin to obtain a resin composition for bonded magnets; and kneading the resin composition for bonded magnets and magnetic powder to obtain a compound for bonded magnets.

The step for obtaining an additive for bonded magnets, and the thermosetting resin and curing agent used in that step are as described for the method of producing a first compound for bonded magnets according to the above embodiments.

The kneading step for obtaining a resin composition for bonded magnets and the thermoplastic resin used in that step are as described for the method of producing a first compound for bonded magnets according to the above embodiments. The cured product of the thermosetting resin and the curing agent having a ratio of the number of reactive groups of the curing agent to the number of reactive groups of the thermosetting resin of at least 2 but not higher than 11 may be melt-kneaded with the thermosetting resin to obtain a melt-kneaded mixture prior to kneading with magnetic powder. The thermoplastic resin and cured product in the kneaded mixture may be fully or partially compatible or incompatible with each other, preferably fully compatible with each other, as long as they are previously melt-kneaded.

When the thermoplastic resin is a crystalline resin, the resin composition for bonded magnets obtained by sufficiently kneading the cured product and the thermoplastic resin has lower melting point and crystallization temperature. Thus, the injection pressure of the compound for bonded magnets also decreases, so that the resulting bonded magnet has improved magnetic properties and orientation ratio as well as a higher coercive force. The melting point of the resin composition for bonded magnets is preferably lower by at least 3.0° C., more preferably lower by at least 4.5° C., than the melting point of the thermoplastic resin. The crystallization temperature of the resin composition for bonded magnets is also preferably lower by at least 2.0° C., more preferably lower by at least 3.0° C., than the crystallization temperature of the thermoplastic resin.

When the thermoplastic resin is polyamide 12, the melting point (peak top) of the resin composition for bonded magnets is preferably at least 160° C. but not higher than 177° C., more preferably at least 170° C. but not higher than 175° C. Moreover, the difference between the peak top of the melting peak and the final melting point of the resin composition for bonded magnets is preferably more than 5.0° C., more preferably more than 5.5° C. Moreover, the melting peak calorie of the resin composition for bonded magnets is preferably at least 50 mJ/mg, more preferably at least 55 mJ/mg. The peak top of the melting peak and the final melting point of the resin composition for bonded magnets may be measured by differential scanning calorimetry (DSC) analysis. The peak top of the melting peak and the final melting point of the resin composition for bonded magnets may be measured, for example, by weighing 10 mg of the resin composition for bonded magnets and subjecting it to DSC analysis using a high-temperature differential scanning calorimeter (DSC6300, available from Hitachi High-Tech Science Corporation) under measurement conditions including an atmosphere (no gas flow), a temperature rise from room temperature to 210° C. (rate of temperature rise: 10° C./min) and down from 210° C. to 30° C. (rate of temperature down: 5° C./min), and a reference of alumina.

The amount of the additive for bonded magnets in the resin composition containing the additive for bonded magnets and the thermoplastic resin is preferably at least 5% by mass but not more than 50% by mass, more preferably at least 10% by mass but not more than 20% by mass. When the amount is more than 50% by mass, the filling ratio of the magnetic powder may decrease. When the amount is less than 5% by mass, the effect of reducing the melting point and crystallization temperature of the melt-kneaded mixture may be small, failing to sufficiently reduce the injection pressure during molding of a bonded magnet.

The step for obtaining a compound for bonded magnets and the magnetic powder used in that step are as described above.

In the method of producing a fourth compound for bonded magnets according to the present embodiment, the compound for bonded magnets is preferably filled with the magnetic powder at a filling ratio of at least 75% by mass but not higher than 96% by mass, more preferably at least 75% by mass but not higher than 94% by mass, still more preferably at least 90% by mass but not higher than 93.5% by mass. When the filling ratio is higher than 96% by mass, the viscosity during injection-molding may become higher, resulting in a decrease in moldability. When the filling ratio is less than 75% by mass, the remanence of the bonded magnet may decrease.

The amount of the resin composition for bonded magnets in the fourth compound for bonded magnets according to the present embodiment is preferably at least 2.5% by mass but not more than 25% by mass, more preferably at least 3.5% by mass but not more than 10% by mass, still more preferably at least 6% by mass but not more than 10% by mass, particularly preferably at least 6.5% by mass but not more than 10% by mass. When the amount of the resin composition for bonded magnets is more than 25% by mass, the remanence of the bonded magnet may decrease. When the amount is less than 2.5% by mass, the viscosity during injection-molding may become higher, resulting in a decrease in moldability.

In the fourth compound for bonded magnets according to the present embodiment, the amount of the resin composition for bonded magnets per 100 parts by mass of the magnetic powder is preferably at least 6 parts by mass but not more than 34 parts by mass, more preferably at least 6.5 parts by mass but not more than 14 parts by mass. When the amount of the resin composition for bonded magnets is more than 34 parts by mass, the remanence of the bonded magnet may decrease. When the amount is less than 6 parts by mass, the viscosity during injection-molding may become higher, resulting in a decrease in moldability.

The compound for bonded magnets according to the present embodiment can be produced as described above.

The fourth compound for bonded magnets according to the present embodiment may contain an organic pigment. The organic pigment is as described above.

The fourth compound for bonded magnets according to the present embodiment containing an organic pigment may be prepared by adding the organic pigment in the step of kneading the additive for bonded magnets, the magnetic powder, and the thermoplastic resin, as described for the first compound for bonded magnets. Alternatively, it may be prepared by adding the organic pigment in the step for obtaining a resin composition for bonded magnets. The amount of the organic pigment in the resin composition for bonded magnets is preferably not more than 10% by mass, more preferably not more than 9.5% by mass. The lower limit is not limited, but it is preferably at least 0.05% by mass, more preferably at least 0.1% by mass. When the amount of the organic pigment is more than 10% by mass, the viscosity during injection-molding may become higher, resulting in a decrease in moldability. When the amount is less than 0.05% by mass, a smaller difference in body color may be provided as compared with when using the resin composition for bonded magnets containing no organic pigment.

The amount of the organic pigment in the fourth compound for bonded magnets is preferably not more than 1% by mass, more preferably not more than 0.95% by mass. The lower limit is not limited, but it is preferably at least 0.05% by mass, more preferably at least 0.1% by mass. When the amount of the organic pigment is more than 1% by mass, the viscosity during injection-molding may become higher, resulting in a decrease in moldability. When the amount is less than 0.05% by mass, a smaller difference in body color may be provided as compared with when using the compound for bonded magnets containing no organic pigment.

In the method of producing a fourth compound for bonded magnets according to the present embodiment, the magnetic powder preferably includes NdFeB-based magnetic powder and SmFeN-based anisotropic magnetic powder. In this case, the ratio by mass of the NdFeB-based magnetic powder to the SmFeN-based anisotropic magnetic powder may be, for example, at least 0.05 but not higher than 5, preferably at least 0.1 but not higher than 4.5, more preferably at least 0.2 but not higher than 4. When the ratio is lower than 0.05, the viscosity during injection-molding may become higher, resulting in a decrease in moldability. When the ratio is higher than 5, the remanence of the bonded magnet may decrease.

In the method of producing a fourth compound for bonded magnets according to the present embodiment, the magnetic powder preferably includes SmFeN-based anisotropic magnetic powder having a surface coated with a phosphate. The details of the coating with a phosphate are as described for the third compound for bonded magnets according to the above embodiments.

In the fourth compound for bonded magnets according to the present embodiment, the amount of the resin composition for bonded magnets per 100 parts by mass of the magnetic powder is preferably at least 2.6 parts by mass but not more than 33 parts by mass, more preferably at least 3.6 parts by mass but not more than 14 parts by mass. When the amount of the resin composition for bonded magnets is more than 33 parts by mass, the remanence of the bonded magnet may decrease. When the amount is less than 2.6 parts by mass, the viscosity during injection-molding may become higher, resulting in a decrease in moldability.

The compound for bonded magnets according to the present embodiment can be produced as described above.

A method of producing a first bonded magnet according to embodiments of the present disclosure includes:
heat curing a thermosetting resin and a curing agent having a ratio of the number of reactive groups of the curing agent to the number of reactive groups of the thermosetting resin of at least 2 but not higher than 11 to obtain an additive for bonded magnets;
kneading the additive for bonded magnets, magnetic powder, and a thermoplastic resin to obtain a compound for bonded magnets in which a filling ratio of the magnetic powder is at least 91.5% by mass; and
injection-molding the compound for bonded magnets.

A method of producing a second bonded magnet according to embodiments of the present disclosure includes:
heat curing a thermosetting resin and a curing agent having a ratio of the number of reactive groups of the curing agent to the number of reactive groups of the thermosetting resin of at least 2 but not higher than 11 to obtain an additive for bonded magnets;
kneading the additive for bonded magnets, magnetic powder, and a thermoplastic resin to obtain a compound for bonded magnets; and
injection-molding the compound for bonded magnets,
the magnetic powder including NdFeB-based magnetic powder and SmFeN-based anisotropic magnetic powder.

A method of producing a third bonded magnet according to embodiments of the present disclosure includes:
heat curing a thermosetting resin and a curing agent having a ratio of the number of reactive groups of the curing agent to the number of reactive groups of the thermosetting resin of at least 2 but not higher than 11 to obtain an additive for bonded magnets;
kneading the additive for bonded magnets, magnetic powder, and a thermoplastic resin to obtain a compound for bonded magnets; and
injection-molding the compound for bonded magnets,
the magnetic powder including SmFeN-based anisotropic magnetic powder having a surface coated with a phosphate.

A method of producing a fourth bonded magnet according to embodiments of the present disclosure includes:
heat curing a thermosetting resin and a curing agent having a ratio of the number of reactive groups of the curing agent to the number of reactive groups of the thermosetting resin of at least 2 but not higher than 11 to obtain an additive for bonded magnets;
kneading the additive for bonded magnets and a thermoplastic resin to obtain a resin composition for bonded magnets;
kneading the resin composition for bonded magnets and magnetic powder to obtain a compound for bonded magnets; and
injection-molding the compound for bonded magnets.

In the four bonded magnet production methods, the step for obtaining an additive for bonded magnets and the kneading step for obtaining a compound for bonded magnets are as described above.

In the injection-molding step, the compound for bonded magnets may be injection-molded into an injection-molded product. The cylinder temperature of the injection-molding machine used may be in any temperature range that can melt the compound for bonded magnets, and is preferably not higher than 260° C. in order to reduce the magnetic degradation of the magnetic powder due to heat. The injection pressure may be any pressure that can inject the molten compound. For example, for injection-molding into a cavity with a diameter of 10 mm and a thickness of 7 mm using an injection-molding machine at a cylinder temperature of 230° C., the injection pressure is preferably such that the compound can be completely loaded into the cavity at less than 250 MPa in view of moldability.

A first bonded magnet according to embodiments of the present disclosure may be obtained by, for example, the method of producing a first bonded magnet according to the above embodiments, and this first bonded magnet contains an additive for bonded magnets, magnetic powder, and a thermoplastic resin, and is filled with the magnetic powder at a filling ratio of at least 91.5% by mass. The first bonded magnet can be formed at a low injection pressure by using a compound for bonded magnets that contains the additive for bonded magnets and has high fluidity. Thus, the magnetic degradation of the magnetic powder caused by injection-molding can be reduced, thereby improving the magnetic properties of the bonded magnet.

The first bonded magnet according to the present embodiment is filled with the magnetic powder at a filling ratio of at least 91.5% by mass, preferably at least 91.8% by mass, more preferably at least 92.2% by mass. The upper limit of the filling ratio is not limited, but it is preferably not higher than 93.2% by mass, more preferably not higher than 92.8% by mass, still more preferably not higher than 92.5% by mass. When the filling ratio is higher than 93.2% by mass, the viscosity during injection-molding may become higher, resulting in a decrease in moldability.

In the first bonded magnet according to the present embodiment, the amount of the additive for bonded magnets in the bonded magnet is preferably at least 0.5% by mass but not more than 4.2% by mass, more preferably at least 0.9% by mass but not more than 3.5% by mass, still more preferably at least 0.9% by mass but not more than 1.2% by mass. When the amount of the additive for bonded magnets is more than 4.2% by mass, the remanence of the bonded magnet may decrease. When the amount is less than 0.5% by mass, the viscosity during injection-molding may become higher, resulting in a decrease in moldability.

In the first bonded magnet according to the present embodiment, the amount of the thermoplastic resin in the bonded magnet is preferably not more than 8.0% by mass, more preferably not more than 6.5% by mass. The lower limit is not limited, but it is preferably at least 4.2% by mass, more preferably at least 5.5% by mass. When the amount of the thermoplastic resin is more than 8.0% by mass, the remanence of the bonded magnet may decrease. When the amount is less than 4.2% by mass, the viscosity during injection-molding may become higher, resulting in a decrease in moldability.

In the first bonded magnet according to the present embodiment, the amount of the additive for bonded magnets per 100 parts by mass of the magnetic powder is preferably at least 0.54 parts by mass but not more than 4.6 parts by mass, more preferably at least 0.95 parts by mass but not more than 4 parts by mass, still more preferably at least 0.97 parts by mass but not more than 1.31 parts by mass. When the amount of the additive for bonded magnets is more than 4.6 parts by mass, the remanence of the bonded magnet may decrease. When the amount is less than 0.54 parts by mass, the viscosity during injection-molding may become higher, resulting in a decrease in moldability.

In the first bonded magnet according to the present embodiment, the amount of the thermoplastic resin per 100 parts by mass of the magnetic powder is preferably at least 4.5 parts by mass but not more than 9 parts by mass, more preferably at least 6 parts by mass but not more than 7 parts by mass. When the amount of the thermoplastic resin is more than 9 parts by mass, the remanence of the bonded magnet may decrease. When the amount is less than 4.5 parts by mass, the viscosity during injection-molding may become higher, resulting in a decrease in moldability.

When the first bonded magnet according to the present embodiment contains an organic pigment, the amount of the organic pigment in the bonded magnet is preferably not more than 0.6% by mass, more preferably not more than 0.55% by mass. The lower limit is not limited, but it is preferably at least 0.05% by mass, more preferably at least 0.1% by mass.

The orientation ratio of the first bonded magnet according to the present embodiment is not limited, but it is preferably at least 98.3%, more preferably at least 99%.

The remanence of the first bonded magnet according to the present embodiment is not limited, but it is preferably at least 0.81 T, more preferably at least 0.82 T, when the magnetic powder is SmFeN-based magnetic powder. A high remanence can be achieved by using the resin additive for bonded magnets according to the present embodiment.

The coercive force of the first bonded magnet according to the present embodiment is not limited, but it is preferably at least 1.100 kA/m, more preferably at least 1,200 kA/m. A high coercive force can be achieved by using the resin additive for bonded magnets according to the present embodiment.

Since the first bonded magnet according to the present embodiment is prepared by kneading the additive for bonded magnets, the magnetic powder, and the thermoplastic resin, the additive for bonded magnets and the magnetic powder are present independently from each other.

A second bonded magnet according to embodiments of the present disclosure may be obtained by, for example, the second method of producing a second bonded magnet according to the above embodiments, and this second bonded magnet contains an additive for bonded magnets, magnetic powder, and a thermoplastic resin. The second bonded magnet can be formed at a low injection pressure by using a compound for bonded magnets that contains the additive for bonded magnets and has high fluidity. Thus, the magnetic degradation of the magnetic powder caused by injection-molding can be reduced, thereby improving the magnetic properties of the bonded magnet.

The second bonded magnet according to the present embodiment is preferably filled with the magnetic powder at a filling ratio of at least 75% by mass but not higher than 96% by mass, more preferably at least 90% by mass but not higher than 95.5% by mass. When the filling ratio is higher than 96% by mass, the viscosity during injection-molding may become higher, resulting in a decrease in moldability. When the filling ratio is less than 75% by mass, the remanence of the bonded magnet may decrease.

In the second bonded magnet according to the present embodiment, the ratio by mass of the NdFeB-based magnetic powder to the SmFeN-based anisotropic magnetic powder may be, for example, at least 0.05 but not higher than 5, preferably at least 0.1 but not higher than 4.5, more preferably at least 0.2 but not higher than 4. When the ratio is lower than 0.05, the viscosity during injection-molding may become higher, resulting in a decrease in moldability. When the ratio is higher than 5, the remanence of the bonded magnet may decrease.

In the second bonded magnet according to the present embodiment, the amount of the additive for bonded magnets in the bonded magnet is preferably at least 0.1% by mass but not more than 4.2% by mass, more preferably at least 0.3% by mass but not more than 3.5% by mass, still more preferably at least 0.5% by mass but not more than 1.2% by mass. When the amount of the additive for bonded magnets is more than 4.2% by mass, the remanence of the bonded magnet may decrease. When the amount is less than 0.1% by mass, the viscosity during injection-molding may become higher, resulting in a decrease in moldability.

In the second bonded magnet according to the present embodiment, the amount of the thermoplastic resin in the bonded magnet is preferably at least 2.5% by mass but not more than 25% by mass, more preferably at least 3.5% by mass but not more than 10% by mass. When the amount of the thermoplastic resin is more than 25% by mass, the remanence of the bonded magnet may decrease. When the amount is less than 2.5% by mass, the viscosity during injection-molding may become higher, resulting in a decrease in moldability.

In the second bonded magnet according to the present embodiment, the amount of the additive for bonded magnets per 100 parts by mass of the magnetic powder is preferably at least 0.1 parts by mass but not more than 5.6 parts by mass, more preferably at least 0.31 parts by mass but not more than 4.67 parts by mass, still more preferably at least 0.52 parts by mass but not more than 1.6 parts by mass. When the amount of the additive for bonded magnets is more than 5.6 parts by mass, the remanence of the bonded magnet may decrease. When the amount is less than 0.1 parts by mass, the viscosity during injection-molding may become higher, resulting in a decrease in moldability.

In the second bonded magnet according to the present embodiment, the amount of the thermoplastic resin per 100 parts by mass of the magnetic powder is preferably at least 2.6 parts by mass but not more than 33 parts by mass, more preferably at least 3.6 parts by mass but not more than 14 parts by mass. When the amount of the thermoplastic resin is more than 33 parts by mass, the remanence of the bonded magnet may decrease. When the amount is less than 2.6 parts by mass, the viscosity during injection-molding may become higher, resulting in a decrease in moldability.

The orientation ratio of the second bonded magnet according to the present embodiment is not limited, but it is preferably at least 98.3%, more preferably at least 99%.

The remanence of the second bonded magnet according to the present embodiment is not limited, but it is preferably at least 0.8 T, more preferably at least 0.9 T. A high remanence can be achieved by using the resin additive for bonded magnets according to the present embodiment.

The coercive force of the second bonded magnet according to the present embodiment is not limited, but it is preferably at least 1,000 kA/m. A high coercive force can be achieved by using the resin additive for bonded magnets according to the present embodiment.

Since the second bonded magnet according to the present embodiment is prepared by kneading the additive for bonded magnets, the magnetic powder, and the thermoplastic resin, the additive for bonded magnets and the magnetic powder are present independently from each other.

A third bonded magnet according to embodiments of the present disclosure may be obtained by, for example, the method of producing a third bonded magnet according to the above embodiments, and this third bonded magnet contains an additive for bonded magnets, magnetic powder, and a thermoplastic resin. The third bonded magnet can be formed at a low injection pressure by using a compound for bonded magnets that contains the additive for bonded magnets and has high fluidity. Thus, the magnetic degradation of the magnetic powder caused by injection-molding can be reduced, thereby improving the magnetic properties of the bonded magnet.

The third bonded magnet according to the present embodiment is preferably filled with the magnetic powder at a filling ratio of at least 75% by mass but not higher than 96% by mass, more preferably at least 90% by mass but not higher than 95.5% by mass. When the filling ratio is higher than 96% by mass, the viscosity during injection-molding may become higher, resulting in a decrease in moldability. When the filling ratio is less than 75% by mass, the remanence of the bonded magnet may decrease.

In the third bonded magnet according to the present embodiment, the amount of the additive for bonded magnets in the bonded magnet is preferably at least 0.1% by mass but not more than 4.2% by mass, more preferably at least 0.3% by mass but not more than 3.5% by mass, still more preferably at least 0.5% by mass but not more than 1.2% by mass. When the amount of the additive for bonded magnets is more than 4.2% by mass, the remanence of the bonded magnet may decrease. When the amount is less than 0.1% by mass, the viscosity during injection-molding may become higher, resulting in a decrease in moldability.

In the third bonded magnet according to the present embodiment, the amount of the thermoplastic resin in the bonded magnet is preferably at least 2.5% by mass but not more than 25% by mass, more preferably at least 3.5% by mass but not more than 10% by mass. When the amount of the thermoplastic resin is more than 25% by mass, the remanence of the bonded magnet may decrease. When the amount is less than 2.5% by mass, the viscosity during injection-molding may become higher, resulting in a decrease in moldability.

In the third bonded magnet according to the present embodiment, the amount of the additive for bonded magnets per 100 parts by mass of the magnetic powder is preferably at least 0.1 parts by mass but not more than 5.6 parts by mass, more preferably at least 0.31 parts by mass but not more than 4.67 parts by mass, still more preferably at least 0.52 parts by mass but not more than 1.6 parts by mass. When the amount of the additive for bonded magnets is more than 5.6 parts by mass, the remanence of the bonded magnet may decrease. When the amount is less than 0.1 parts by mass, the viscosity during injection-molding may become higher, resulting in a decrease in moldability.

In the third bonded magnet according to the present embodiment, the amount of the thermoplastic resin per 100 parts by mass of the magnetic powder is preferably at least 2.6 parts by mass but not more than 33 parts by mass, more preferably at least 3.6 parts by mass but not more than 14 parts by mass. When the amount of the thermoplastic resin is more than 33 parts by mass, the remanence of the bonded magnet may decrease. When the amount is less than 2.6 parts by mass, the viscosity during injection-molding may become higher, resulting in a decrease in moldability.

The orientation ratio of the third bonded magnet according to the present embodiment is not limited, but it is preferably at least 98%, more preferably at least 99%.

The remanence of the third bonded magnet according to the present embodiment is not limited, but it is preferably at least 0.75 T, more preferably at least 0.8 T. A high remanence can be achieved by using the additive for bonded magnets according to the present embodiment.

The coercive force of the third bonded magnet according to the present embodiment is not limited, but it is preferably at least 1,100 kA/m, more preferably at least 1,200 kA/m, particularly preferably at least 1,450 kA/m. A high coercive force can be achieved by using the additive for bonded magnets according to the present embodiment.

Since the third bonded magnet according to the present embodiment is prepared by kneading the additive for bonded magnets, the magnetic powder, and the thermoplastic resin, the additive for bonded magnets and the magnetic powder are present independently from each other.

A fourth bonded magnet according to embodiments of the present disclosure may be obtained by, for example, the method of producing a fourth bonded magnet according to the above embodiments, and this fourth bonded magnet contains a resin composition for bonded magnets and magnetic powder. The fourth bonded magnet can be formed at a low injection pressure by using a compound for bonded magnets that contains the resin composition for bonded magnets and has high fluidity. Thus, the magnetic degradation of the magnetic powder caused by injection-molding can be reduced, thereby improving the magnetic properties of the bonded magnet.

The fourth bonded magnet according to the present embodiment is preferably filled with the magnetic powder at a filling ratio of at least 75% by mass but not higher than 94% by mass, more preferably at least 90% by mass but not higher than 93.5% by mass. When the filling ratio is higher than 94% by mass, the viscosity during injection-molding may become higher, resulting in a decrease in moldability. When the filling ratio is less than 75% by mass, the remanence of the bonded magnet may decrease.

In the fourth bonded magnet according to the present embodiment, the amount of the resin composition for bonded magnets in the bonded magnet is preferably at least 6% by mass but not more than 25% by mass, more preferably at least 6.5% by mass but not more than 10% by mass. When the amount of the resin composition for bonded magnets is more than 25% by mass, the remanence of the bonded magnet may decrease. When the amount is less than 6% by mass, the viscosity during injection-molding may become higher, resulting in a decrease in moldability.

The orientation ratio of the fourth bonded magnet according to the present embodiment is not limited, but it is preferably at least 98.3%, more preferably at least 99%.

The remanence of the fourth bonded magnet according to the present embodiment is not limited, but it is preferably at least 0.81 T, more preferably at least 0.82 T, when the magnetic powder is SmFeN-based magnetic powder. A high remanence can be achieved by using the resin composition for bonded magnets according to the present embodiment containing a melt-kneaded mixture of a thermoplastic resin with a cured product of a thermosetting resin and a curing agent.

The coercive force of the fourth bonded magnet according to the present embodiment is not limited, but it is preferably at least 1,150 kA/m, more preferably at least 1,200 kA/m. A high coercive force can be achieved by using the resin composition for bonded magnets according to the present embodiment containing a melt-kneaded mixture of a thermoplastic resin with a cured product of a thermosetting resin and a curing agent.

In the fourth bonded magnet according to the present embodiment, the amount of the resin composition for bonded magnets per 100 parts by mass of the magnetic powder is preferably at least 6 parts by mass but not more than 34 parts by mass, more preferably at least 6.5 parts by mass but not more than 14 parts by mass. When the amount of the resin composition for bonded magnets is more than 34 parts by mass, the remanence of the bonded magnet may decrease. When the amount is less than 6 parts by mass, the viscosity during injection-molding may become higher, resulting in a decrease in moldability.

When the fourth bonded magnet according to the present embodiment contains an organic pigment, the amount of the organic pigment in the bonded magnet is preferably not more than 1% by mass, more preferably not more than 0.95% by mass. The lower limit is not limited, but it is preferably at least 0.05% by mass, more preferably at least 0.1% by mass.

Since the fourth bonded magnet according to the present embodiment is prepared by kneading the resin composition for bonded magnets and the magnetic powder, the resin composition for bonded magnets and the magnetic powder are present independently from each other.

Method of Producing Phosphate-Coated SmFeN-Based Anisotropic Magnetic Powder

In the methods of producing a first, second, or fourth compound for bonded magnets according to the above embodiments, the magnetic powder is preferably phosphate-coated SmFeN-based anisotropic magnetic powder having a surface coated with a phosphate. Moreover, in the method of producing a third compound for bonded magnets according to the above embodiments, the magnetic powder includes SmFeN-based anisotropic magnetic powder having a surface coated with a phosphate. The phosphate-coated SmFeN-based anisotropic magnetic powder may be prepared by a phosphate treatment step comprising adding an inorganic acid to a slurry containing SmFeN-based anisotropic magnetic powder, water, and a phosphate compound so that the slurry is adjusted to have a pH of at least 1 but not higher than 4.5 to obtain SmFeN-based anisotropic magnetic powder having a surface coated with a phosphate.

Phosphate Treatment Step

In the phosphate treatment step, an inorganic acid may be added to a slurry containing SmFeN-based anisotropic magnetic powder, water, and a phosphate compound so that the pH of the slurry is adjusted to at least 1 but not higher than 4.5 to obtain SmFeN-based anisotropic magnetic powder having a surface coated with a phosphate. The phosphate-coated SmFeN-based anisotropic magnetic powder can be formed by reacting the metal component (for example, iron or samarium) of the SmFeN-based anisotropic magnetic powder with the phosphate component of the phosphate compound to precipitate a phosphate (for example, iron phosphate or samarium phosphate) on the surface of the SmFeN-based anisotropic magnetic powder. According to the present embodiment, it is believed that by adding an inorganic acid so that the pH of the slurry is adjusted to at least 1 but not higher than 4.5, the amount of the phosphate precipitate can be increased as compared to when no inorganic acid is added, and the resulting phosphate-coated SmFeN-based anisotropic magnetic powder has a thick coating and thus a higher coercive force (iHc). Moreover, it is believed that since water is used as a solvent in the present embodiment, the precipitated phosphate has a smaller particle size than that obtained using an organic solvent as a solvent, and the resulting phosphate-coated SmFeN-based anisotropic magnetic powder has a dense coating and thus a higher coercive force (iHc).

The slurry containing SmFeN-based anisotropic magnetic powder, water, and a phosphate compound may be prepared by any method. For example, the slurry may be obtained by mixing SmFeN-based anisotropic magnetic powder with a phosphate aqueous solution containing a phosphate compound and water as a solvent. The amount of the SmFeN-based anisotropic magnetic powder in the slurry is, for example, at least 1% by mass but not more than 50% by mass, but in view of productivity, it is preferably at least 5% by mass but not more than 20% by mass. The amount of the phosphate component ($PO_4$) of the slurry as calculated as $PO_4$ is, for example, at least 0.01% by mass but not more than 10% by mass, but in view of reactivity between the metal component and the phosphate component and productivity, it is preferably at least 0.05% by mass but not more than 5% by mass.

The phosphate aqueous solution may be obtained by mixing a phosphate compound with water. Examples of the phosphate compound include orthophosphoric acid, sodium dihydrogen phosphate, sodium monohydrogen phosphate, ammonium dihydrogen phosphate, ammonium monohydrogen phosphate, zinc phosphate, calcium phosphate, and other phosphates, hypophosphorous acid and hypophosphites, pyrophosphoric acid, polyphosphoric acid, and other inorganic phosphoric acids, and organic phosphoric acids, and salts thereof. These may be used alone, or two or more of these may be used in combination. To enhance the water resistance and corrosion resistance of the coating and the magnetic properties of the magnetic powder, additives may be used including, for example, oxoacid salts such as molybdate, tungstate, vanadate, and chromate; oxidizing agents such as sodium nitrate and sodium nitrite, and chelating agents such as EDTA.

The concentration of the phosphate (calculated as $PO_4$) in the phosphate aqueous solution is, for example, at least 5% by mass but not more than 50% by mass, but in view of the solubility and storage stability of the phosphate compound and ease of chemical treatment, it is preferably at least 10% by mass but not more than 30% by mass. The pH of the phosphate aqueous solution is, for example, at least 1 but not higher than 4.5, but it is preferably at least 1.5 but not higher than 4 in order to easily control the precipitation rate of the phosphate. The pH may be adjusted using dilute hydrochloric acid, dilute sulfuric acid, or the like.

In the phosphate treatment step, an inorganic acid may be added so that the pH of the slurry is adjusted to at least 1 but not higher than 4.5, preferably to at least 1.6 but not higher than 3.9, more preferably to at least 2 but not higher than 3. When the pH is lower than 1, aggregation of the phosphate-coated SmFeN-based anisotropic magnetic powder particles tends to occur starting from the locally highly precipitated phosphate, resulting in lower coercive force. When the pH is higher than 4.5, the amount of the precipitated phosphate tends to decrease, resulting in insufficient coating and thus lower coercive force. Examples of the inorganic acid to be added include hydrochloric acid, nitric acid, sulfuric acid, boric acid, and hydrofluoric acid. In the phosphate treatment step, the inorganic acid may be added as required to adjust the pH within the above-mentioned range. The inorganic acid is used in view of liquid waste disposal, but an organic acid may be used together depending on the purpose. Examples of the organic acid include acetic acid, formic acid, and tartaric acid.

The phosphate treatment step may be performed such that the lower limit of the phosphate content of the resulting phosphate-coated SmFeN-based anisotropic magnetic powder is higher than 0.5% by mass. The lower limit of the phosphate content of the phosphate-coated SmFeN-based anisotropic magnetic powder obtained in the phosphate treatment step is preferably at least 0.55% by mass, particularly preferably at least 0.75% by mass. The upper limit of the phosphate content is preferably not higher than 4.5% by mass, more preferably not higher than 2.5% by mass, particularly preferably not higher than 2% by mass. When the phosphate content is not higher than 0.5% by mass, the effect of the coating with the phosphate tends to be reduced. When the phosphate content is higher than 4.5% by mass, aggregation of the phosphate-coated SmFeN-based anisotropic magnetic powder particles tends to occur, resulting in lower coercive force. Herein, the phosphate content of the magnetic powder is determined by an ICP atomic emission spectroscopy (ICP-AES) converted into an amount of $PO_4$ molecule.

The adjustment of the slurry containing SmFeN-based anisotropic magnetic powder, water, and a phosphate compound to have a pH within the range of at least 1 but not higher than 4.5 is preferably performed for at least 10 minutes. To reduce the thin parts of the coating, the adjustment is more preferably performed for at least 30 minutes. In the pH maintenance, as the pH initially increases rapidly, the inorganic acid for pH control needs to be introduced at short intervals. Then, as the coating proceeds, the pH changes gently, and thus the inorganic acid may be introduced at longer intervals, which allows one to determine the end point of the reaction.

Oxidation Step after Phosphate Treatment

The phosphate-coated SmFeN-based anisotropic magnetic powder may optionally be oxidized. When the phosphate-coated SmFeN-based anisotropic magnetic powder is oxidized, the surface of the base material SmFeN-based anisotropic magnetic powder coated with a phosphate is oxidized to form an iron oxide layer which enhances the oxidation resistance of the phosphate-coated SmFeN-based anisotropic magnetic powder. Moreover, the oxidation can inhibit undesirable oxidation-reduction reaction, decomposition reaction, and alteration from occurring on the surface of the SmFeN particles when the phosphate-coated SmFeN-based anisotropic magnetic powder is exposed to a high temperature in the bonded magnet production. Therefore, it is possible to provide a magnet having high magnetic properties, particularly high intrinsic coercive force (iHc).

The oxidation may be carried out by subjecting the SmFeN-based anisotropic magnetic powder obtained after the phosphate treatment to heat treatment in an oxygen-containing atmosphere. The reaction atmosphere preferably contains oxygen in an inert gas such as nitrogen or argon. The oxygen concentration is preferably at least 3% but not more than 21%, more preferably at least 3.5% but not more than 10%. During the oxidation reaction, it is preferred to perform gas exchange at a flow rate of at least 2 L/min but not higher than 10 L/min per 1 kg of the magnetic powder.

The temperature during the oxidation is preferably at least 150° C. but not higher than 250° C., more preferably at least 170° C. but not higher than 230° C. When the temperature is lower than 150° C., the formation of an iron oxide layer tends to be insufficient, resulting in lower oxidation resistance. When the temperature is higher than 250° C., the formation of an iron oxide layer tends to be excessive, resulting in lower coercive force. The reaction time is preferably at least three hours but not more than ten hours.

Phosphate-Coated SmFeN-Based Anisotropic Magnetic Powder

The phosphate-coated SmFeN-based anisotropic magnetic powder in the present embodiment has a DSC exothermic onset temperature of 170° C. or higher and a phosphate content of more than 0.5% by mass.

The phosphate-coated SmFeN-based anisotropic magnetic powder has a DSC exothermic onset temperature of 170° C. or higher, preferably 200° C. or higher. The DSC exothermic onset temperature indicates an overall evaluation of the properties of the phosphate coating, including density, thickness, and oxidation resistance. A high coercive force can be obtained when the DSC exothermic onset temperature is 170° C. or higher. The DSC exothermic onset temperature may be measured, for example, by weighing 20 mg of the phosphate-coated SmFeN-based anisotropic magnetic powder and subjecting it to DSC analysis using a high-temperature differential scanning calorimeter (DSC6300, available from Hitachi High-Tech Science Corporation) under measurement conditions including an air atmosphere (200 mL/min), a temperature rise from room temperature to 400° C. (rate of temperature rise: 20° C./min), and a reference of alumina (20 mg). A higher exothermic onset temperature indicates that the phosphate coating is more densely formed because in that case, heat generation is less likely to occur by oxidation. The phosphate content of the phosphate-coated SmFeN-based anisotropic magnetic powder is as described for the phosphate treatment step described above.

The phosphate-coated SmFeN-based anisotropic magnetic powder preferably has a XRD diffraction pattern in which the ratio (I)/(II) of the diffraction peak intensity (I) of the (110) plane of αFe to the peak intensity (II) of the (300) plane of the SmFeN-based magnetic powder is not higher than $2.0 \times 10^{-2}$, more preferably not higher than $1.0 \times 10^{-2}$. The diffraction peak intensity (I) of the (110) plane of αFe indicates the abundance of αFe as an impurity. A high coercive force can be obtained when the aforementioned ratio (I)/(II) is not higher than $2.0 \times 10^{-2}$. The diffraction peak intensities in the XRD diffraction pattern may be measured under the conditions described later in Examples. The diffraction peak intensities in the XRD diffraction pattern may be determined, for example, by measuring a XRD pattern of the phosphate-coated SmFeN-based anisotropic magnetic powder using powder X-ray crystal diffraction instrument (available from Rigaku Corporation, X-ray wavelength: CuKa1). Then, the diffraction peak intensity of the (110) plane of α-Fe may be divided by the peak intensity of the (300) plane of $Sm_2Fe_{17}N_3$ to obtain a value as an α-Fe peak height ratio. A lower α-Fe peak height ratio indicates a smaller amount of α-Fe as an impurity.

The phosphate-coated SmFeN-based anisotropic magnetic powder has a DSC exothermic onset temperature of 170° C. or higher, preferably 200° C. or higher. The DSC exothermic onset temperature indicates an overall evaluation of the properties of the phosphate coating, including density, thickness, and oxidation resistance. A high coercive force can be obtained when the DSC exothermic onset temperature is 170° C. or higher. The DSC exothermic onset temperature may be measured under the conditions described later in Examples. Here, the phosphate content of the phosphate-coated SmFeN-based anisotropic magnetic powder is as described for the phosphate treatment step described above.

The phosphate-coated SmFeN-based anisotropic magnetic powder preferably has a carbon content of not higher than 1,000 ppm, more preferably not higher than 800 ppm. The carbon content indicates the amount of the organic impurities in the phosphate. When the phosphate-coated SmFeN-based anisotropic magnetic powder having a carbon content higher than 1,000 ppm is exposed to a high temperature in the bonded magnet production, the organic impurities tend to be decomposed to form defects in the coating, resulting in lower coercive force. Herein, the carbon content may be measured by a TOC method.

In view of the coercive force of the phosphate-coated SmFeN-based anisotropic magnetic powder, the phosphate-coated SmFeN-based anisotropic magnetic powder preferably has a phosphate coating having a thickness of at least 10 nm but not more than 200 nm. The thickness of the phosphate coating may be measured by composition analysis using EDX line analysis at a cross section of the phosphate-coated SmFeN-based anisotropic magnetic powder.

Silica Treatment Step

The SmFeN-based anisotropic magnetic powder obtained after the phosphate treatment may optionally be subjected to a silica treatment. Formation of a silica thin film on the magnetic powder enhances oxidation resistance. The silica thin film may be formed, for example, by mixing an alkyl silicate, phosphate-coated SmFeN-based anisotropic magnetic powder, and an alkali solution.

Silane Coupling Treatment Step

The magnetic powder obtained after the silica treatment may be further treated with a silane coupling agent. When the magnetic powder with a silica thin film formed thereon is subjected to a silane coupling treatment, a coupling agent film is formed on the silica thin film, which improves the magnetic properties of the magnetic powder as well as wettability between the magnetic powder and the resin and magnet strength. Any silane coupling agent may be used and may be selected depending on the type of resin. Examples of the silane coupling agent include 3-aminopropyltriethoxysilane, γ-(2-aminoethyl)aminopropyltrimethoxysilane, γ-(2-aminoethyl)aminopropylmethyldimethoxysilane, γ-methacryloxypropyltrimethoxysilane, γ-methacryloxypropylmethyldimethoxysilane, N-β-(N-vinylbenzylaminoethyl)-γ-aminopropyltrimethoxysilane hydrochloride, γ-glycidoxypropyltrimethoxysilane, γ-mercaptopropyltrimethoxysilane, methyltrimethoxysilane, methyltriethoxysilane, vinyltriacetoxysilane, γ-chloropropyltrimethoxysilane, hexamethylenedisilazane, γ-anilinopropyltrimethoxysilane, vinyltrimethoxysilane, octadecyl[3-(trimethoxysilyl)propyl]ammonium chloride. γ-chloropropylmethyldimethoxysilane, γ-mercaptopropylmethyldimethoxysilane, methyltrichlorosilane, dimethyldichlorosilane, trimethylchlorosilane, vinyltrichlorosilane, vinyltris(β-methoxyethoxy)silane, vinyltriethoxysilane, β-(3,4-epoxycyclohexyl)ethyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, ureidopropyltriethoxysilane, γ-isocyanatopropyltriethoxysilane, polyethoxydimethylsiloxane, polyethoxymethylsiloxane, bis(trimethoxysilylpropyl)amine, bis(3-triethoxysilylpropyl) tetrasulfane, γ-isocyanatopropyltrimethoxysilane, vinylmethyldimethoxysilane, 1,3,5-N-tris(3-trimethoxysilylpropyl)isocyanurate, t-butyl carbamate trialkoxysilane, and N-(1,3-dimethylbutylidene)-3-(triethoxysilyl)-1-propaneamine. These silane coupling agents may be used alone, or two or more of them may be used in combination. The amount of the silane coupling agent added per 100 parts by mass of the magnetic powder is preferably at least 0.2 parts by mass but not more than 0.8 parts by mass, more preferably at least 0.25 parts by mass but not more than 0.6 parts by mass. When the amount is less than 0.2 parts by mass, the effect of the silane coupling agent tends to be small. When the amount is more than 0.8 parts by mass, the magnetic properties of the magnetic powder or magnet tend to decrease due to aggregation of the magnetic powder.

The SmFeN-based anisotropic magnetic powder obtained after the phosphate treatment step, oxidation step, silica treatment, or silane coupling treatment may be filtered, dehydrated, and dried in a usual manner.

SmFeN-Based Anisotropic Magnetic Powder

Any SmFeN-based anisotropic magnetic powder may be used in the phosphate treatment step. A suitable example is SmFeN-based anisotropic magnetic powder produced by a method including:

mixing a solution containing Sm and Fe with a precipitant to obtain a precipitate containing Sm and Fe (precipitation step);

firing the precipitate to obtain an oxide containing Sm and Fe (oxidation step);

heat treating the oxide in a reducing gas-containing atmosphere to obtain a partial oxide (pretreatment step);

reducing the partial oxide (reduction step); and nitriding alloy particles obtained in the reduction step (nitridation step).

Precipitation Step

In the precipitation step, a Sm raw material and a Fe raw material may be dissolved in a strong acid solution to prepare a solution containing Sm and Fe. When it is desired to obtain $Sm_2Fe_{17}N_3$ as the main phase, the molar ratio of Sm and Fe (Sm:Fe) is preferably 1.5:17 to 3.0:17, more preferably 2.0:17 to 2.5:17. To the aforementioned solution may be added a raw material such as La, W, Co, Ti, Sc, Y, Pr, Nd, Pm, Gd, Tb, Dy, Ho, Er, Tm, or Lu.

Any Sm or Fe raw material which can be dissolved in a strong acid solution may be used. In view of availability, examples of the Sm raw material include samarium oxide, and examples of the Fe raw material include $FeSO_4$. The concentration of the solution containing Sm and Fe may be appropriately adjusted within a range in which the Sm raw material and the Fe raw material can be substantially dissolved in the acid solution. In view of solubility, the acid solution may include sulfuric acid.

The solution containing Sm and Fe may be reacted with a precipitant to obtain an insoluble precipitate containing Sm and Fe. Here, the solution containing Sm and Fe may be such that the solution contains Sm and Fe at the time of the reaction with a precipitant. For example, separate solutions containing a Sm raw material and a Fe raw material, respectively, may be prepared and dropwise added to be reacted with a precipitant. When separate solutions are prepared, the solutions may be appropriately adjusted within a range in which the respective raw materials are substantially dissolved in an acid solution. The precipitant may be any precipitant that is an alkali solution and can react with the solution containing Sm and Fe to give a precipitate. Examples include ammonia water and caustic soda, preferably caustic soda.

To easily control the particle properties of the precipitate, the precipitation reaction is preferably carried out by separately dropwise adding the solution containing Sm and Fe and the precipitant to a solvent such as water. A precipitate having a homogeneous element distribution, a sharp particle size distribution, and a uniform particle shape can be obtained by appropriately controlling the feeding rates of the solution containing Sm and Fe and the precipitant, the reaction temperature, the concentration of the reaction solution, the pH during the reaction, and other conditions. The use of such a precipitate enhances the magnetic properties of the magnetic powder as a final product. The reaction temperature may be 0 to 50° C., preferably 35 to 45° C. The concentration of the reaction solution as calculated as the total concentration of metal ions is preferably 0.65 mol/L to 0.85 mol/L, more preferably 0.7 mol/L to 0.84 mol/L. The pH during the reaction is preferably 5 to 9, more preferably 6.5 to 8.

The anisotropic magnetic powder particles obtained in the precipitation step roughly determine the particle size, particle shape, and particle size distribution of the finally prepared magnetic powder. When the particle size of the prepared particles is measured with a wet laser diffraction particle size distribution analyzer, the size and distribution of the entire particles preferably substantially fall within a range of 0.05 to 20 μm, preferably 0.1 to 10 μm. Moreover, the average particle size of the anisotropic magnetic powder is defined as the particle size corresponding to the 50th percentile of the cumulative undersize particle size distribution by volume. Preferably, the average particle size of the anisotropic magnetic powder is within a range of 0.1 to 10 μm.

After separating the precipitate, the separated precipitate is preferably subjected to desolvation in order to inhibit changes in particle size distribution, particle size, or other properties and aggregation of the precipitate upon evaporation of the solvent caused when the precipitate is re-dissolved in the remaining solvent during the heat treatment in the subsequent oxidation step. Specifically, when the solvent used is water, the desolvation may be carried out by drying in an oven at 70 to 200° C. for 5 to 12 hours.

The precipitation step may be followed by separating and washing the precipitate. The washing step may be appropriately performed until the conductivity of the supernatant solution reaches 5 mS/m² or less. The precipitate separation step may be carried out, for example, by mixing the precipitate with a solvent (preferably water) and subjecting the mixture to filtering, decantation, or other separation processes.

Oxidation Step

In the oxidation step, the precipitate formed in the precipitation step may be fired to obtain an oxide containing Sm and Fe. For example, the precipitate may be converted into an oxide by heat treatment. Heat-treatment of the precipitate needs to be performed in the presence of oxygen, for example in an air atmosphere. Moreover, since the presence of oxygen is necessary, the non-metal portion of the precipitate preferably contains an oxygen atom.

The heat treatment temperature (hereinafter, oxidation temperature) in the oxidation step is not limited, but it is preferably 700 to 1,300° C., more preferably 900 to 1,200° C. When the heating treatment temperature is lower than 700° C., insufficient oxidation tends to occur. When the heating treatment temperature is higher than 1,300° C., the resulting magnetic powder tends not to have the desired shape, average particle size, and particle size distribution. The heat treatment time is not limited either, but it is preferably one to three hours.

The thus formed oxide is oxide particles in which Sm and Fe have been microscopically sufficiently mixed, and the shape, particle size distribution, and other properties of the precipitate have been reflected.

Pretreatment Step

In the pretreatment step, the oxide containing Sm and Fe may be heat-treated in a reducing gas atmosphere to obtain a partial oxide which is a partially reduced oxide.

Herein, the partial oxide refers to a partially reduced oxide. The oxygen concentration in the oxide is not limited, but it is preferably not more than 10% by mass, more preferably not more than 8% by mass. When the concentration is more than 10% by mass, heat generation caused by reduction with Ca tends to become higher in the reduction step, increasing the firing temperature to form abnormally grown particles. Herein, the oxygen concentration in the partial oxide may be measured by a non-dispersive infrared (ND-IR) analysis.

The reducing gas may be appropriately selected from hydrocarbon gases such as hydrogen ($H_2$), carbon monoxide (CO), and methane ($CH_4$), and other gases. In view of the cost, hydrogen gas is preferred. The flow rate of the gas may be appropriately adjusted within a range that does not cause scattering of the oxide. The heat treatment temperature during the pretreatment step (hereinafter, pretreatment temperature) is in the range of at least 300° C. but not higher than 950° C., and is preferably 400° C. or higher, more preferably 750° C. or higher, but preferably lower than 900° C. When the pretreatment temperature is 300° C. or higher, the oxide containing Sm and Fe can be efficiently reduced. When the pretreatment temperature is not higher than 950° C., growth and segregation of the oxide particles can be inhibited so that the desired particle size can be maintained.

Moreover, when the reducing gas is hydrogen, it is preferred to adjust the thickness of the oxide layer used to not more than 20 mm, and also to adjust the dew point in the reaction furnace to not higher than −10° C.

Reduction Step

In the reduction step, the partial oxide may be reduced in the presence of a reducing agent at at least 920° C. but not higher than 1,200° C. to obtain alloy particles. For example, the reduction may be carried out by contacting the partial oxide with molten calcium or calcium vapor. In view of magnetic properties, the heat treatment temperature is preferably at least 950° C. but not higher than 1,150° C., more preferably at least 980° C. but not higher than 1,100° C. For a more uniform reduction reaction, the heat treatment time is preferably shorter than 120 minutes, more preferably shorter than 90 minutes. The lower limit of the heat treatment time is preferably at least 10 minutes, more preferably at least 30 minutes.

The metal calcium may be used in the form of particles or powder and preferably has a particle size of not more than 10 mm. This can more effectively inhibit aggregation during the reduction reaction. Moreover, the metal calcium may be added in an amount that is 1.1 to 3.0 times, preferably 1.5 to 2.0 times, the reaction equivalent (which is the stoichiometric amount needed to reduce the Sm oxide, but includes the amount needed to reduce the Fe oxide, if present).

In the reduction step, a disintegration accelerator may optionally be used together with the metal calcium as a reducing agent. The disintegration accelerator may be appropriately used to facilitate the disintegration or granulation of the product in the water washing step described later. Examples of the disintegration accelerator include alkaline earth metal salts such as calcium chloride and alkaline earth oxides such as calcium oxide. Such a disintegration accelerator may be used in an amount of 1 to 30% by mass, preferably 5 to 28% by mass, relative to the amount of the Sm oxide used as the Sm source.

Nitridation Step

In the nitridation step, the alloy particles obtained in the reduction step may be nitrided to obtain anisotropic magnetic particles. Since porous aggregated alloy particles can be obtained in the reduction step due to the use of the particulate precipitate obtained in the precipitation step described above, they can be immediately nitrided by heat treatment in a nitrogen atmosphere without milling, thereby resulting in uniform nitridation.

The heat treatment temperature in the nitridation of the alloy particles (hereinafter, nitridation temperature) is preferably 300 to 600° C., particularly preferably 400 to 550° C. and the heat treatment may be performed within the temperature range indicated above with the atmosphere being substituted with a nitrogen atmosphere. The heat treatment time may be selected so that the alloy particles can be sufficiently uniformly nitrided.

The product obtained after the nitridation step may contain, in addition to the magnetic particles, materials such as by-product CaO and unreacted metal calcium, which may be combined as sintered aggregates. In this case, the product may be introduced into cold water to separate CaO and metal calcium as a suspension of calcium hydroxide ($Ca(OH)_2$) from the magnetic particles. Further, the residual calcium hydroxide may be sufficiently removed by washing the magnetic particles with an acetic acid or the like.

The SmFeN-based anisotropic magnetic powder produced as described above may be a nitride having a $Th_2Zn_{17}$-type crystal structure and containing the rare earth metal samarium (Sm), iron (Fe), and nitrogen (N) as represented by the general formula: $Sm_xFe_{100-x-y}N_y$, preferably wherein x is at least 8.1 at % but not more than 10 at %; y is at least 13.5 at % but not more than 13.9 at %; and the balance is mainly Fe.

The average particle size of the SmFeN-based anisotropic magnetic powder is preferably at least 2 μm but not more than 5 μm, more preferably at least 2.5 μm but not more than 4.8 μm. When the average particle size is less than 2 μm, the amount of the magnetic powder filled in the bonded magnet tends to decrease, resulting in lower magnetization. When the average particle size is more than 5 μm, the bonded magnet tends to have a lower coercive force. Herein, the average particle size is measured under dry conditions using a laser diffraction particle size distribution analyzer.

The particle size D10 of the SmFeN-based anisotropic magnetic powder is preferably at least 1 μm but not more than 3 μm, more preferably at least 1.5 μm but not more than 2.5 μm. When the D10 is less than 1 μm, the amount of the magnetic powder filled in the bonded magnet tends to decrease, resulting in lower magnetization. When the D10 is more than 3 μm, the bonded magnet tends to have a lower coercive force. Herein, the D10 is defined as the particle size corresponding to the 10th percentile of the cumulative particle size distribution by volume of the SmFeN-based anisotropic magnetic powder.

The particle size D50 of the SmFeN-based anisotropic magnetic powder is preferably at least 2.5 μm but not more than 5 μm, more preferably at least 2.7 μm but not more than 4.8 μm. When the D50 is less than 2.5 μm, the amount of the magnetic powder filled in the bonded magnet tends to decrease, resulting in lower magnetization. When the D50 is more than 5 μm, the bonded magnet tends to have a lower coercive force. Herein, D50 is defined as the particle size corresponding to the 50th percentile of the cumulative particle size distribution by volume of the SmFeN-based anisotropic magnetic powder.

The particle size D90 of the SmFeN-based anisotropic magnetic powder is preferably at least 3 μm but not more than 7 μm, more preferably at least 4 μm but not more than 6 μm. When the D90 is less than 3 μm, the amount of the magnetic powder filled in the bonded magnet tends to decrease, resulting in lower magnetization. When the D90 is more than 7 μm, the bonded magnet tends to have a lower coercive force. Herein, the D90 is defined as the particle size corresponding to the 90th percentile of the cumulative particle size distribution by volume of the SmFeN-based anisotropic magnetic powder.

In view of coercive force, the SmFeN-based anisotropic magnetic powder preferably has a below-defined span of not more than 2, more preferably not more than 1.5: Span=(D90−D10)/D50

The circularity of the SmFeN-based anisotropic magnetic powder is not limited, but it is preferably at least 0.5, more preferably at least 0.6. When the circularity is less than 0.5, stress may occur between the particles during molding due to deteriorated fluidity, thereby resulting in a decrease in magnetic properties. Herein, the circularity may be determined by taking a SEM image at a magnification of 3,000, processing the image for binarization, and calculating the circularity of each particle. The circularity defined in the present disclosure refers to the average of the circularities obtained by measuring about 1,000 to 10,000 particles. In general, the larger the number of small particles, the higher the circularity. Thus, particles having a particle size of 1 μm or more are measured for circularity. The circularity measurement uses the definitional equation: Circularity=4 $\pi S/L2$, wherein S represents the area of the two-dimensional projection of the particle, and L represents the perimeter of the two-dimensional projection.

The phosphate-coated SmFeN-based anisotropic magnetic powder in the present embodiment may be used mainly in bonded magnets.

EXAMPLES

Compound for Bonded Magnets Containing SmFeN-Based Anisotropic Magnetic Powder

The materials used in the following examples and comparative examples are listed below.

Epoxy resin: biphenyl type (epoxy equivalent weight: 186 g/eq)

Curing agent: diaminodiphenyl sulfone (DDS, active hydrogen equivalent weight: 62.0 g/eq)

Curing accelerator: triphenylphosphine (TPP)

Magnetic powder: surface-treated SmFeN-based magnetic powder (Z12P-P1 available from Nichia Corporation, average particle size 3 μm (monodisperse particle size distribution), remanence Br of magnetic powder alone: 1.319 T)

Thermoplastic resin: polyamide 12 (ZZ3000P available from Daicel-Evonik Ltd.)

Production Example 1

Preparation of Magnetic Powder

An amount of 100 parts by mass of SmFeN-based magnetic powder was surface-treated with 1.875 parts by mass of ethyl silicate and 0.4 parts by mass of 3-aminopropyltriethoxysilane (Z-6011 available from Dow Corning Toray Co., Ltd.) to prepare surface-treated SmFeN-based magnet powder.

Production Example 2

Preparation of Additive for Bonded Magnets

An amount of 12 parts by mass of an epoxy resin, 8.9 parts by mass of a curing agent, and 0.4 parts by mass of a curing accelerator were dissolved and mixed in 100 parts by mass of acetone. After evaporating the acetone, the mixture was cured using a tray dryer in a nitrogen atmosphere at 200° C. for six hours. The cured product was milled in a mixer and then classified using a 500 μm-aperture sieve to prepare an additive for bonded magnets.

Production Example 3

Preparation of Resin Composition for Bonded Magnets

An amount of 17.4 parts by mass of the additive for bonded magnets obtained in Production Example 2 was melt-kneaded with 100 parts by mass of polyamide 12 using a twin screw kneader in a 210° C. atmosphere to obtain a resin composition for bonded magnets.

Example 1

Preparation of Compound for Bonded Magnets

An amount of 100 parts by mass of the surface-treated SmFeN-based magnetic powder prepared in Production Example 1 was mixed with 1.2 parts by mass of the additive for bonded magnets prepared in Production Example 2 and 6.7 parts by mass of polyamide 12, and they were melt extrusion-kneaded at 210° C. in a twin screw kneader to obtain a compound for bonded magnets.

Preparation of Bonded Magnet

The compound for bonded magnets was injection-molded at a cylinder temperature of 230° C., a die temperature of 90° C., and an injection pressure of 186 MPa to obtain a bonded magnet having a diameter of 10 mm and a thickness of 7 mm.

Example 2

Preparation of Compound for Bonded Magnets

An amount of 100 parts by mass of the surface-treated SmFeN-based magnetic powder prepared in Production Example 1 was mixed with 7.9 parts by mass of the resin composition for bonded magnets obtained in Production Example 3, and they were melt extrusion-kneaded at 210° C. in a twin screw kneader to obtain a compound for bonded magnets.

Preparation of Bonded Magnet

A bonded magnet was prepared from the compound for bonded magnets as in Example 1. The injection pressure in the injection-molding was 144 MPa.

Example 3

Preparation of Compound for Bonded Magnets

A compound for bonded magnets was prepared as in Example 2, except that 100 parts by mass of the surface-treated SmFeN-based magnetic powder prepared in Production Example 1 was kneaded with 7.2 parts by mass of the resin composition for bonded magnets obtained in Production Example 3.

Preparation of Bonded Magnet

A bonded magnet was prepared from the compound for bonded magnets as in Example 1. The injection pressure in the injection-molding was 241 MPa.

Comparative Example 1

Preparation of Compound for Bonded Magnets

An amount of 100 parts by mass of the surface-treated SmFeN-based magnetic powder prepared in Production Example 1 was mixed with 7.7 parts by mass of polyamide 12, and they were melt extrusion-kneaded at 210° C. in a twin screw kneader to obtain a compound for bonded magnets.

Preparation of Bonded Magnet

A bonded magnet was prepared from the compound for bonded magnets as in Example 1. The injection pressure in the injection-molding was 235 MPa.

Comparative Example 2

Preparation of Compound for Bonded Magnets

An amount of 100 parts by mass of the surface-treated SmFeN-based magnetic powder prepared in Production Example 1 was mixed with 7.4 parts by mass of polyamide 12, and they were melt extrusion-kneaded at 210° C. in a twin screw kneader to obtain a compound for bonded magnets.

Preparation of Bonded Magnet

The compound for bonded magnets was used to follow the same procedure as in Example 1, but was unable to be completely loaded into the injection die, thus failing to obtain a molded article.

The remanence Brand orientation ratio of the bonded magnets obtained in the examples and comparative examples were evaluated as described below. Table 1 shows the evaluation results.

Remanence, Coercive Force, and Orientation Ratio

The SmFeN-based magnetic powder prepared in Production Example 1 was packed together with a paraffin wax into a sample vessel. After the paraffin wax was melted using a dryer, the easy axes of magnetization were aligned in an orientation field of 2 T. The magnetically oriented sample was pulse magnetized in a magnetizing field of 6 T, and the remanence Br (T) and coercive force (iHe, kA/m) of the sample were measured using a vibrating sample magnetometer (VSM) with a maximum field of 2 T. The SmFeN-based magnetic powder was found to have a remanence of 1.319 T and a coercive force of 1,300 kA/m.

The prepared bonded magnets were measured for remanence Br (T) and coercive force iHc (kA/m) using a BH tracer. The orientation ratio was calculated by the following equation:

$$\text{Orientation ratio (\%)} = Br(T) / [(\text{Volume filling ratio (vol \%) of SmFeN-based magnetic powder}) \div 100 \times 1.319\ (T)] \times 100.$$

netic powder-filling ratio, demonstrating that the fluidity of the compound for bonded magnets in Example 3 was improved. It was also demonstrated that Example 3 also exhibited a high orientation ratio and an increased remanence.

As shown in Table 1, the injection pressure of Example 2 using the resin composition for bonded magnets was further lower than that of Example 1, demonstrating that the fluidity of the compound for bonded magnets in Example 2 was further improved.

Polyamide 12, powder mixture prepared by mixing polyamide 12 and the additive for bonded magnets prepared in Production Example 2 at a ratio indicated in Table 2 below, and the resin composition for bonded magnets prepared in Production Example 3 were subjected to DSC measurement. The DSC measurement was performed using a differential scanning calorimeter while the temperature was increased at a rate of 10° C./min to 210° C. and then reduced at a rate of 5° C./min to 30° C. Table 2 shows the melting peaks, crystallization peaks, and other values.

TABLE 1

| Example No. | PA12 resin component vol % | PA12 resin component wt % | SmFeN magnetic powder vol % | SmFeN magnetic powder wt % | Result of molding Br (T) | Result of molding iHc (kA/m) | Result of molding Orientation ratio (%) | Result of molding Injection molding pressure (MPa) |
|---|---|---|---|---|---|---|---|---|
| Comparative Example 1 | 38.3 | 7.6 | 61.7 | 92.4 | 0.80 | 1067 | 98.0 | 235 |
| Comparative Example 2 | 36.6 | 7.2 | 63.4 | 92.8 | | Unmoldable | | |
| Example 1 | 38.3 | 7.8 | 61.7 | 92.2 | 0.81 | 1252 | 100.0 | 1.86 |
| Example 2 | 38.3 | 7.8 | 61.7 | 92.2 | 0.81 | 1350 | 100.0 | 144 |
| Example 3 | 36.6 | 7.3 | 63.4 | 92.7 | 0.82 | 1211 | 98.3 | 241 |

As shown in Table 1, the injection pressures of Examples 1 and 2 were lower than that of Comparative Example 1 with the same magnetic powder-filling ratio, demonstrating that the fluidity of the compounds for bonded magnets in Examples 1 and 2 was improved. It was also demonstrated

TABLE 2

| PA12 (%) | Additive for bonded magnets (%) | Mixing method | Melting peak Peak top (° C.) | Melting peak Final melting point (° C.) | Melting peak Height (mW) | Melting peak Area (mJ/mg) | Crystallization peak Peak top (° C.) | Crystallization peak Height (mW) | Crystallization peak Area (mJ/mg) |
|---|---|---|---|---|---|---|---|---|---|
| 100 | 0 | — | 178.9 | 183.9 | 16.8 | 63.9 | 155.9 | 13.1 | 52.9 |
| 85 | 15 | Powder mixing | 175.9 | 181.9 | 7.2 | 51.3 | 149.0 | 10.2 | 47.2 |
| 85 | 15 | Melt mixing | 174.2 | 179.6 | 10.3 | 55.8 | 152.6 | 14.9 | 47.3 | that as the compounds for bonded magnets had improved fluidity, the magnetic powder in the bonded magnets showed an improved orientation ratio and an increased remanence.

As shown in Table 1, injection-molding could not be achieved in Comparative Example 2, while injection-molding could be performed in Example 3 with the same mag- The melting point and crystallization temperature of the resin composition for bonded magnets in which the cured product and polyamide 12 were previously melt-kneaded were reduced by about 5° C. and about 3° C., respectively. It is believed that the reductions in melting point and crystallization temperature will slow down the cooling and solidification of the resin in a die during injection-molding, thereby improving the fluidity of the compound for bonded magnets.

Example 4

Preparation of Compound for Bonded Magnets

An amount of 100 parts by mass of the surface-treated SmFeN-based magnetic powder prepared in Production Example 1 was mixed with 1.27 parts by mass of the additive for bonded magnets prepared in Production Example 2 and 7.19 parts by mass of polyamide 12, and they were melt extrusion-kneaded at 210° C. in a twin screw kneader to obtain a compound for bonded magnets.

Preparation of Bonded Magnet

The compound for bonded magnets was injection-molded at a cylinder temperature of 230° C., a die temperature of 90° C., and an injection pressure of 186 MPa to obtain a bonded magnet having a diameter of 10 mm and a thickness of 7 mm.

Example 5

Preparation of Compound for Bonded Magnets

An amount of 100 parts by mass of the surface-treated SmFeN-based magnetic powder prepared in Production Example 1 was mixed with 8.45 parts by mass of the resin composition for bonded magnets obtained in Production Example 3, and they were melt extrusion-kneaded at 210° C. in a twin screw kneader to obtain a compound for bonded magnets.

Preparation of Bonded Magnet

A bonded magnet was prepared from the compound for bonded magnets as in Example 4. The injection pressure in the injection-molding was 144 MPa.

Example 6

Preparation of Compound for Bonded Magnets

A compound for bonded magnets was prepared as in Example 5, except that 100 parts by mass of the surface-treated SmFeN-based magnetic powder prepared in Production Example 1 was kneaded with 7.87 parts by mass of the resin composition for bonded magnets obtained in Production Example 3.

Preparation of Bonded Magnet

A bonded magnet was prepared from the compound for bonded magnets as in Example 4. The injection pressure in the injection-molding was 241 MPa.

Comparative Example 3

Preparation of Compound for Bonded Magnets

An amount of 100 parts by mass of the surface-treated SmFeN-based magnetic powder prepared in Production Example 1 was mixed with 8.23 parts by mass of polyamide 12, and they were melt extrusion-kneaded at 210° C. in a twin screw kneader to obtain a compound for bonded magnets.

Preparation of Bonded Magnet

A bonded magnet was prepared from the compound for bonded magnets as in Example 4. The injection pressure in the injection-molding was 235 MPa.

Comparative Example 4

Preparation of Compound for Bonded Magnets

An amount of 100 parts by mass of the surface-treated SmFeN-based magnetic powder prepared in Production Example 1 was mixed with 7.76 parts by mass of polyamide 12, and they were melt extrusion-kneaded at 210° C. in a twin screw kneader to obtain a compound for bonded magnets.

Preparation of Bonded Magnet

The compound for bonded magnets was used to follow the same procedure as in Example 4, but was unable to be completely loaded into the injection die, thus failing to obtain a molded article.

The remanence Br and orientation ratio of the bonded magnets obtained in the examples and comparative examples were evaluated as described below. Table 3 shows the evaluation results.

Remanence, Coercive Force, and Orientation Ratio

The SmFeN-based magnetic powder prepared in Production Example 1 was packed together with a paraffin wax into a sample vessel. After the paraffin wax was melted using a dryer, the easy axes of magnetization were aligned in an orientation field of 2 T. The magnetically oriented sample was pulse magnetized in a magnetizing field of 6 T, and the remanence Br (T) and coercive force (iHc, kA/m) of the sample were measured using a vibrating sample magnetometer (VSM) with a maximum field of 2 T. The SmFeN-based magnetic powder was found to have a remanence of 1.319 T and a coercive force of 1,300 kA/m.

The prepared bonded magnets were measured for remanence Br (T) and coercive force (iHc, kA/m) using a BH tracer. The orientation ratio was calculated by the following equation:

$$\text{Orientation ratio (\%)} = Br\,(\text{T}) / [(\text{Volume filling ratio (vol \%) of SmFeN–based magnetic powder}) \div 100 \times 1.319\,(\text{T})] \times 100.$$

TABLE 3

| | | | | | | | Result of molding | | |
|---|---|---|---|---|---|---|---|---|---|
| Example | PA12 resin component | | SmFeN magnetic powder | | Br | iHc | Orientation ratio | Injection molding pressure |
| No. | vol % | wt % | vol % | wt % | (T) | (kA/m) | (%) | (MPa) |
| Comparative Example 3 | 38.3 | 7.6 | 61.7 | 92.4 | 0.80 | 1067 | 98.0 | 235 |
| Comparative | 36.6 | 7.2 | 63.4 | 92.8 | | Unmoldable | | |

TABLE 3-continued

| | PA12 resin componet | | SmFeN magnetic powder | | Result of molding | | | |
|---|---|---|---|---|---|---|---|---|
| | | | | | Br | iHc | Orientation ratio | Injection molding pressure |
| Example No. | vol % | wt % | vol % | wt % | (T) | (kA/m) | (%) | (MPa) |
| Example 4 | | | | | | | | |
| Example 4 | 38.3 | 7.8 | 61.7 | 92.2 | 0.81 | 1252 | 100.0 | 186 |
| Example 5 | 38.3 | 7.8 | 61.7 | 92.2 | 0.81 | 1350 | 100.0 | 144 |
| Example 6 | 36.6 | 7.3 | 63.4 | 92.7 | 0.82 | 1211 | 98.3 | 241 |

As shown in Table 3, the injection pressures of Examples 4 and 5 were lower than that of Comparative Example 3 with the same volume filling ratio of the magnetic powder, demonstrating that the fluidity of the compounds for bonded magnets in Examples 4 and 5 was improved. It was also demonstrated that as the compounds for bonded magnets had improved fluidity, the magnetic powder in the bonded magnets showed an improved orientation ratio and an increased remanence.

As shown in Table 3, injection-molding could not be achieved in Comparative Example 4, while injection-molding could be performed in Example 6 with the same volume filling ratio of the magnetic powder, demonstrating that the fluidity of the compound for bonded magnets in Example 6 was improved. It was also demonstrated that Example 6 also exhibited a high orientation ratio and an increased remanence.

As shown in Table 3, the injection pressure of Example 5 using the resin composition for bonded magnets was further lower than that of Example 4, demonstrating that the fluidity of the compound for bonded magnets in Example 5 was further improved.

Compound for Bonded Magnets Containing Organic Pigment

Example 7

Preparation of Compound for Bonded Magnets

An amount of 100 parts by mass of the surface-treated SmFeN-based magnetic powder prepared in Production Example 1 was mixed with 7.95 parts by mass of the resin composition for bonded magnets obtained in Production Example 3 and 0.5 parts by mass of quinacridone (CAS1047-16-1), and they were melt extrusion-kneaded at 210° C. in a twin screw kneader to obtain a compound for bonded magnets.

Preparation of Bonded Magnet

A bonded magnet was prepared from the compound for bonded magnets as in Example 1. The injection pressure in the injection-molding was 235 MPa.

Example 8

Preparation of Compound for Bonded Magnets

An amount of 100 parts by mass of the surface-treated SmFeN-based magnetic powder prepared in Production Example 1 was mixed with 8.2 parts by mass of the resin composition for bonded magnets obtained in Production Example 3 and 0.25 parts by mass of copper phthalocyanine (CAS147-14-8), and they were melt extrusion-kneaded at 210° C. in a twin screw kneader to obtain a compound for bonded magnets.

Preparation of Bonded Magnet

A bonded magnet was prepared from the compound for bonded magnets as in Example 4. The injection pressure in the injection-molding was 200 MPa.

The remanence Br and orientation ratio of the bonded magnets obtained in Examples 7 and 8 were evaluated as in Example 5. Table 4 shows the evaluation results.

Colorimetry

The L* value, a* value, and b* value of the bonded magnets obtained in Examples 5, 7, and 8 were evaluated using a spectrophotometer (CM-700d available from Konica Minolta). Table 4 shows the evaluation results.

TABLE 4

| | SmFeN magnetic powder | | | Result of molding | | | Calorimetric result | | |
|---|---|---|---|---|---|---|---|---|---|
| Example No. | vol % | wt % | Organic pigment | Br (T) | iHc (kA/m) | Injection pressure (MPa) | L* | a* | b* |
| Example 5 | 61.7 | 92.2 | — | 0.81 | 1.350 | 144 | 38.0 | 0.25 | 2.68 |
| Example 7 | 61.7 | 92.2 | Quinacridone | 0.81 | 1238 | 235 | 37.8 | 3.09 | 2.29 |
| Example 8 | 61.7 | 92.2 | Copper phthalocyanine | 0.81 | 1188 | 200.9 | 37.4 | −2.54 | 0.37 |

It was demonstrated that in Examples 7 and 8, it was possible to change the body color while maintaining the remanence, as compared to Example 5.

Compound for bonded magnets containing SmFeN-based anisotropic magnetic powder and NdFeB-based anisotropic magnetic powder The materials used in the following examples and comparative examples are listed below.

Epoxy resin: biphenyl type (epoxy equivalent weight: 186 g/eq)

Curing agent: diaminodiphenyl sulfone (DDS, active hydrogen equivalent weight: 62.0 g/eq)

Curing accelerator: triphenylphosphine (TPP)

SmFeN-based anisotropic magnetic powder (Z12P-P1 available from Nichia Corporation, average particle size 3 μm (monodisperse particle size distribution), remanence Br of magnetic powder alone: 1.32 T, coercive force 948 kA/m)

NdFeB-based anisotropic magnetic powder (MF-18P available from Aichi Steel Corporation, average particle size 130.5 μm (VMD), D50: 124.9 μm, D90: 211.3 μm, remanence Br of magnetic powder alone: 1.24 T, coercive force 1,356 kA/m)

Thermoplastic resin: polyamide 12 (ZZ3000P available from Daicel-Evonik Ltd.)

Production Example 4

Preparation of Magnetic Powder

An amount of 100 parts by mass of SmFeN-based magnetic powder was surface-treated with 1.875 parts by mass of ethyl silicate and 0.4 parts by mass of 3-aminopropyltriethoxysilane (Z-6011 available from Dow Corning Toray Co., Ltd.) to prepare surface-treated SmFeN-based magnet powder.

An amount of 100 parts by mass of NdFeB-based magnetic powder was surface-treated with 1.875 parts by mass of ethyl silicate and 0.4 parts by mass of 3-aminopropyltriethoxysilane (Z-6011 available from Dow Corning Toray Co., Ltd.) to prepare surface-treated NdFeB-based magnet powder.

Production Example 5

Preparation of Additive for Bonded Magnets

An amount of 12 parts by mass of an epoxy resin, 8.8 parts by mass of a curing agent, and 0.4 parts by mass of a curing accelerator were dissolved and mixed in 100 parts by mass of acetone. After evaporating the acetone, the mixture was cured using a tray dryer in a nitrogen atmosphere at 200° C. for six hours. The cured product was milled in a mixer and then classified using a 500 μm-aperture sieve to prepare an additive for bonded magnets.

Production Example 6

Preparation of Resin Composition for Bonded Magnets

An amount of 17.4 parts by mass of the additive for bonded magnets obtained in Production Example 5 was melt-kneaded with 100 parts by mass of polyamide 12 using a twin screw kneader at 210° C. to obtain a resin composition for bonded magnets.

Example 9

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 1.08 parts by mass of the additive for bonded magnets prepared in Production Example 5 and 6.24 parts by mass of polyamide 12, and they were melt extrusion-kneaded using a twin screw kneader at 210° C. to obtain a compound for bonded magnets.

Preparation of Bonded Magnet

The compound for bonded magnets was injection-molded at a cylinder temperature of 260° C. and a die temperature of 90° C. to obtain a bonded magnet having a diameter of 10 mm and a thickness of 7 mm. The injection pressure in the injection-molding was 51 MPa.

Example 10

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 0.91 parts by mass of the additive for bonded magnets prepared in Production Example 5 and 5.29 parts by mass of polyamide 12, and they were melt extrusion-kneaded using a twin screw kneader at 210° C. to obtain a compound for bonded magnets.

Preparation of Bonded Magnet

A bonded magnet was prepared from the compound for bonded magnets as in Example 9. The injection pressure in the injection-molding was 82 MPa.

Example 11

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 0.77 parts by mass of the additive for bonded magnets prepared in Production Example 5 and 4.44 parts by mass of polyamide 12, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 143 MPa.

Example 12

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 0.57 parts by mass of the additive for bonded magnets prepared in Production Example 5 and 4.18 parts by mass of polyamide 12, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 246 MPa.

Example 13

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 7.32 parts by mass of the resin composition for bonded magnets prepared in Production Example 6, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 49 MPa.

Example 14

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 6.2 parts by mass of the resin composition for bonded magnets prepared in Production Example 6, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 76 MPa.

Example 15

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 5.2 parts by mass of the resin composition for bonded magnets prepared in Production Example 6, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 139 MPa.

Example 16

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 4.17 parts by mass of the resin composition for bonded magnets prepared in Production Example 6, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 238 MPa.

Comparative Example 5

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 7.14 parts by mass of polyamide 12, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 53 MPa.

Comparative Example 6

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 6.06 parts by mass of polyamide 12, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 91 MPa.

Comparative Example 7

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 5.08 parts by mass of polyamide 12, and they were melt extrusion-kneaded at 210° C. in a twin screw kneader to obtain a compound for bonded magnets.

Preparation of Bonded Magnet

A bonded magnet was prepared from the compound for bonded magnets as in Example 9. The injection pressure in the injection-molding was 153 MPa.

Comparative Example 8

Preparation of Compound for Bonded Magnets

The surface-treated SmFeN-based anisotropic magnetic powder and surface-treated NdFeB-based magnetic powder prepared in Production Example 4 were mixed at a mass ratio of 50:50 (volume ratio=50.5:49.5). An amount of 100 parts by mass of the magnetic powder mixture was mixed with 4.63 parts by mass of polyamide 12, and they were melt extrusion-kneaded at 210° C. in a twin screw kneader to obtain a compound for bonded magnets.

Preparation of Bonded Magnet

The compound for bonded magnets was used to follow the same procedure as in Example 9, but was unable to be completely loaded into the injection die, thus failing to obtain a molded article.

The remanence Br, coercive force iHc, and orientation ratio of the bonded magnets obtained in the examples and comparative examples were evaluated as described below. Table 5 shows the evaluation results.

Remanence, Coercive Force, and Orientation Ratio

The prepared bonded magnets were measured for remanence Br (T) and coercive force iHc (kA/m) using a BH tracer. The orientation ratio was calculated by the following equation:

Orientation ratio (%) =

-continued (Remanence $Br$(T) measured with $BH$ tracer)/[Remanence $Br$(T) of SmFeN-based anisotropic magnetic powder alone) ×

(Volume filling ratio (vol %) of magnetic powder mixture) ÷ 100 ×

(Volume ratio SmFeN-based anisotropic magnetic powder) ÷ 100 +

(Remanence $Br$(T) of NdFeB-based magnetic powder alone) ×

(Volume filling ratio (vol %) of magnetic powder mixture ) ÷ 100 ×

(Volume ratio of NdFeB-based magnetic powder) ÷ 100].

TABLE 5

| | Mixing method | Magnetic powder component | | Molded article | | | Orientation ratio % |
|---|---|---|---|---|---|---|---|
| | | vol % | wt % | Br (T) | iHc (kA/m) | Injection pressure (MPa) | |
| Example 9 | Powder mixing | 64.0 | 93.18 | 0.82 | 1001 | 51 | 100 |
| Example 10 | Powder mixing | 67.5 | 94.16 | 0.87 | 1008 | 82 | 100 |
| Example 11 | Powder mixing | 71.0 | 95.05 | 0.89 | 1005 | 143 | 102 |
| Example 12 | Powder mixing | 71.8 | 95.48 | 0.90 | 1001 | 746 | 102 |
| Example 13 | Melt mixing | 64.0 | 93.18 | 0.82 | 1006 | 49 | 100 |
| Example 14 | Melt mixing | 67.5 | 94.16 | 0.86 | 1000 | 76 | 100 |
| Example 15 | Melt mixing | 71.0 | 95.05 | 0.89 | 1004 | 139 | 102 |
| Example 16 | Melt mixing | 71.8 | 95.99 | 0.90 | 1008 | 238 | 102 |
| Comparative Example 5 | — | 64.0 | 93.33 | 0.82 | 987 | 53 | 100 |
| Comparative Example 6 | — | 67.5 | 94.29 | 0.86 | 975 | 91 | 100 |
| Comparative Example | — | 71.0 | 95.17 | 0.89 | 987 | 153 | 102 |
| Comparative Example 8 | — | 71.8 | 95.58 | — | — | — | — |

As shown in Table 5, the injection pressure of each example was lower than that of the corresponding comparative example with the same volume filling ratio of the magnetic powder, demonstrating that the fluidity of the compounds for bonded magnets in the examples was improved. It was also demonstrated that as the compounds for bonded magnets had improved fluidity, the bonded magnets showed a higher coercive force.

Compound for Bonded Magnets Containing Phosphate-Coated SmFeN-Based Anisotropic Magnetic Powder The materials used in the following examples and comparative examples are listed below.

Epoxy resin: biphenyl type (epoxy equivalent weight: 186 g/eq)

Curing agent: diaminodiphenyl sulfone (DDS, active hydrogen equivalent weight: 62.0 g/eq)

Curing accelerator: triphenylphosphine (TPP)

Thermoplastic resin: polyamide 12 (ZZ3000P available from Daicel-Evonik Ltd.)

Production Example 7

Preparation of SmFeN-Based Anisotropic Magnetic Powder

An amount of 5.0 kg of $FeSO_4 \cdot 7H_2O$ was mixed and dissolved in 2.0 kg of pure water. To the mixture were further added 0.49 kg of $Sm_2O_3$ and 0.74 kg of 70% sulfuric acid, and they were well stirred and completely dissolved. Next, pure water was added to the resulting solution so that the final Fe and Sm concentrations were adjusted to 0.726 mol/L and 0.112 mol/L, respectively, to obtain a SmFe sulfate solution.

Precipitation Step

The entire amount of the SmFe sulfate solution was dropwise added to 20 kg of pure water kept at a temperature of 40° C. with stirring over 70 minutes from the start of the reaction, while simultaneously dropwise adding a 15% ammonia solution to adjust the pH to 7 to 8. Thus, a slurry containing SmFe hydroxide was obtained. The slurry was washed with pure water by decantation. Then, solid-liquid separation was performed to separate the hydroxide. The separated hydroxide was dried in an oven at 100° C. for ten hours.

Oxidation Step

The hydroxide obtained in the precipitation step was fired in the air at 1,000° C. for one hour. After cooling, a red SmFe oxide as raw material powder was obtained.

Pretreatment Step

An amount of 100 g of the SmFe oxide was put in a steel container to a thickness of 10 mm. The container was placed in a furnace, and the pressure was reduced to 100 Pa. Then, while introducing hydrogen gas, the temperature was increased to a pretreatment temperature of 850° C. and maintained for 15 hours. The oxygen concentration was measured by a non-dispersive infrared (ND-IR) analysis (EMGA-820 available from Horiba Ltd.) and found to be 5% by mass. The results show that a black partial oxide was obtained in which the oxygen bonded to Sm remained unreduced while 95% of the oxygen bonded to Fe was reduced.

Reduction Step

An amount of 60 g of the partial oxide obtained in the pretreatment step was mixed with 19.2 g of a metal calcium having an average particle size of about 6 mm, and the mixture was placed in a furnace. After vacuum evacuation of the furnace, argon gas (Ar gas) was introduced. The temperature was increased to 1,045° C. and maintained for 45 minutes to obtain Fe—Sm alloy particles.

Nitridation Step

Subsequently, the temperature inside the furnace was reduced to 100° C. followed by vacuum evacuation. Then, while introducing nitrogen gas, the temperature was increased to 450° C. and maintained for 23 hours to obtain a magnetic particle-containing aggregated product.

Water Washing Step

The aggregated product obtained in the nitridation step was introduced into 3 kg of pure water and stirred for 30 minutes. After standing still, the supernatant was drained by decantation. The introduction into pure water, stirring, and decantation were repeated 10 times. Next, 2.5 g of 99.9% acetic acid was introduced and stirred for 15 minutes. After standing still, the supernatant was drained by decantation. The introduction into pure water, stirring, and decantation were repeated twice, followed by dehydration and drying, and then mechanical cracking to obtain SmFeN-based anisotropic magnetic powder (average particle size 3 μm).

Production Example 8

Phosphate Treatment Step 1

A phosphate treatment liquid was prepared by mixing 85% orthophosphoric acid, sodium dihydrogen phosphate, and sodium molybdate dihydrate at a mass ratio of 1:6:1 and adding pure water and dilute hydrochloric acid to adjust the pH and the $PO_4$ concentration to 2.5 and 20% by mass, respectively. An amount of 1,000 g of the SmFeN-based anisotropic magnetic powder obtained in Production Example 7 was stirred in a dilute hydrochloric acid containing 70 g of hydrogen chloride for one minute to remove the oxidized surface films and contaminants, followed by repeating draining and filling of water until the supernatant had a conductivity of not higher than 100 μS/cm. Thus, a slurry containing 10% by mass of the SmFeN-based anisotropic magnetic powder was obtained. While stirring the slurry, 100 g of the phosphate treatment liquid prepared above was entirely introduced into a treatment bath. The pH of the phosphate treatment reaction slurry rose from 2.5 to 6 over five minutes. After stirring for 15 minutes, the reaction slurry was subjected to suction filtration, dehydration, and vacuum drying to obtain phosphate-coated SmFeN-based anisotropic magnetic powder.

Silica Treatment Step

The phosphate-coated SmFeN-based anisotropic magnetic powder, ethyl silicate 40, and 12.5% by mass ammonia water were mixed at a mass ratio of 97.8:1.8:0.4 in a mixer. The mixture was heated at 200° C. in vacuum to obtain SmFeN-based anisotropic magnetic powder with a silica thin film formed on the particle surface.

Silane Coupling Treatment Step

The SmFeN-based anisotropic magnetic powder with a silica thin film and 12.5% by mass ammonia water were mixed in a mixer. Then, the mixture was mixed with a 50% by mass solution of 3-aminopropyltriethoxysilane in ethanol in the mixer. The mass ratio of the SmFeN-based anisotropic magnetic powder with a silica thin film, the 12.5 by mass ammonia water, and the 50% by mass solution of 3-aminopropyltriethoxysilane in ethanol was 99:0.2:0.8. The mixture was dried in a nitrogen atmosphere at 100° C. for ten hours to obtain silane coupling-treated SmFeN-based anisotropic magnetic powder.

Production Example 9

Phosphate Treatment Step 2

A phosphate treatment liquid was prepared by mixing 85% orthophosphoric acid, sodium dihydrogen phosphate, and sodium molybdate dihydrate at a mass ratio of 1:6:1 and adding pure water and dilute hydrochloric acid to adjust the pH and the $PO_4$ concentration to 2 and 20% by mass, respectively. An amount of 1,000 g of the SmFeN-based anisotropic magnetic powder obtained in Production Example 7 was stirred in a dilute hydrochloric acid containing 70 g of hydrogen chloride for one minute to remove the oxidized surface films and contaminants, followed by repeating draining and filling of water until the supernatant had a conductivity of not higher than 100 μS/cm. Thus, a slurry containing 10% by mass of the SmFeN-based anisotropic magnetic powder was obtained. While stirring the slurry, 100 g of the phosphate treatment liquid prepared above was entirely introduced into a treatment bath. Subsequently, the pH of the phosphate treatment reaction slurry was controlled within the range of 2.5±0.1 and maintained for 30 minutes by introducing 6% by mass hydrochloric acid as required. Then, the reaction slurry was subjected to suction filtration, dehydration, and vacuum drying to obtain phosphate-coated SmFeN-based anisotropic magnetic powder.

Oxidation Step after Phosphate Treatment

An amount of 1,000 g of the phosphate-coated SmFeN-based anisotropic magnetic powder was gradually heated from room temperature in a gaseous mixture of nitrogen and air (oxygen concentration 4%, 5 L/min) to perform heat treatment at a maximum temperature of 170° C. for eight hours. Thus, oxidized SmFeN-based anisotropic magnetic powder was obtained.

Silica Treatment Step

The oxidized SmFeN-based anisotropic magnetic powder, ethyl silicate 40, and 12.5% by mass ammonia water were mixed at a mass ratio of 97.8:1.8:0.4 in a mixer. The mixture was heated at 200° C. in vacuum to obtain SmFeN-based anisotropic magnetic powder with a silica thin film formed on the particle surface.

Silane Coupling Treatment Step

The SmFeN-based anisotropic magnetic powder with a silica thin film and 12.5% by mass ammonia water were mixed in a mixer. Then, the mixture was mixed with a 50% by mass solution of 3-aminopropyltriethoxysilane in ethanol in the mixer. The mass ratio of the SmFeN-based anisotropic magnetic powder with a silica thin film, the 12.5% by mass ammonia water, and the 50% by mass solution of 3-aminopropyltriethoxysilane in ethanol was 99:0.2:0.8. The mixture was dried in a nitrogen atmosphere at 100° C. for ten hours to obtain silane coupling-treated SmFeN-based anisotropic magnetic powder.

Production Example 10

Preparation of Additive for Bonded Magnets

An amount of 12 parts by mass of an epoxy resin, 8.8 parts by mass of a curing agent, and 0.4 parts by mass of a curing accelerator were dissolved and mixed in 100 parts by mass of acetone. After evaporating the acetone, the mixture was cured using a tray dryer in a nitrogen atmosphere at 200° C. for six hours. The cured product was milled in a mixer and then classified using a 500 μm-aperture sieve to prepare an additive for bonded magnets.

Production Example 11

Preparation of Resin Composition for Bonded Magnets

An amount of 17.4 parts by mass of the additive for bonded magnets obtained in Production Example 10 was melt-kneaded with 100 parts by mass of polyamide 12 using a twin screw kneader in a 210° C. atmosphere to obtain a resin composition for bonded magnets.

Example 17

Preparation of Compound for Bonded Magnets

An amount of 100 parts by mass of the silane coupling-treated SmFeN-based anisotropic magnetic powder prepared in Production Example 8 was mixed with 1.27 parts by mass of the additive for bonded magnets prepared in Production Example 10 and 7.19 parts by mass of polyamide 12, and they were melt extrusion-kneaded using a twin screw kneader in a 210° C. atmosphere to obtain a compound for bonded magnets.

Preparation of Bonded Magnet

The compound for bonded magnets was injection-molded at a cylinder temperature of 230° C., a die temperature of 90° C., and an injection pressure of 186 MPa to obtain a bonded magnet having a diameter of 10 mm and a thickness of 7 mm.

Example 18

Preparation of Compound for Bonded Magnets

An amount of 100 parts by mass of the silane coupling-treated SmFeN-based anisotropic magnetic powder prepared in Production Example 8 was mixed with 8.46 parts by mass of the resin composition for bonded magnets prepared in Production Example 11, and they were melt extrusion-kneaded using a twin screw kneader in a 210° C. atmosphere to obtain a compound for bonded magnets.

Preparation of Bonded Magnet

A bonded magnet was prepared from the compound for bonded magnets as in Example 17. The injection pressure in the injection-molding was 144 MPa.

Example 19

Preparation of Compound for Bonded Magnets

An amount of 100 parts by mass of the silane coupling-treated SmFeN-based anisotropic magnetic powder prepared in Production Example 8 was mixed with 7.89 parts by mass of the resin composition for bonded magnets prepared in Production Example 11, and they were melt extrusion-kneaded using a twin screw kneader in a 210° C. atmosphere to obtain a compound for bonded magnets.

Preparation of Bonded Magnet

A bonded magnet was prepared from the compound for bonded magnets as in Example 17. The injection pressure in the injection-molding was 241 MPa.

Example 20

Preparation of Compound for Bonded Magnets

An amount of 100 parts by mass of the silane coupling-treated SmFeN-based anisotropic magnetic powder prepared in Production Example 9 was mixed with 8.46 parts by mass of the resin composition for bonded magnets prepared in Production Example 11, and they were melt extrusion-kneaded using a twin screw kneader in a 210° C. atmosphere to obtain a compound for bonded magnets.

Preparation of Bonded Magnet

A bonded magnet was prepared from the compound for bonded magnets as in Example 17. The injection pressure in the injection-molding was 115 MPa.

Example 21

Preparation of Compound for Bonded Magnets

An amount of 100 parts by mass of the silane coupling-treated SmFeN-based anisotropic magnetic powder prepared in Production Example 9 was mixed with 7.89 parts by mass of the resin composition for bonded magnets prepared in Production Example 11, and they were melt extrusion-kneaded using a twin screw kneader in a 210° C. atmosphere to obtain a compound for bonded magnets.

Preparation of Bonded Magnet

A bonded magnet was prepared from the compound for bonded magnets as in Example 17. The injection pressure in the injection-molding was 230 MPa.

Comparative Example 9

Preparation of Compound for Bonded Magnets

An amount of 100 parts by mass of the silane coupling-treated SmFeN-based anisotropic magnetic powder prepared in Production Example 8 was mixed with 8.27 parts by mass of polyamide 12, and they were melt extrusion-kneaded using a twin screw kneader in a 210° C. atmosphere to obtain a compound for bonded magnets.

Preparation of Bonded Magnet

A bonded magnet was prepared from the compound for bonded magnets as in Example 17. The injection pressure in the injection-molding was 235 MPa.

Comparative Example 10

Preparation of Compound for Bonded Magnets

An amount of 100 parts by mass of the silane coupling-treated SmFeN-based anisotropic magnetic powder prepared in Production Example 8 was mixed with 7.7 parts by mass of polyamide 12, and they were melt extrusion-kneaded using a twin screw kneader in a 210° C. atmosphere to obtain a compound for bonded magnets.

Preparation of Bonded Magnet

The compound for bonded magnets was used to follow the same procedure as in Example 17, but was unable to be completely loaded into the injection die, thus failing to obtain a molded article.

The remanence Br, coercive force iHc, and orientation ratio of the bonded magnets obtained in the examples and comparative examples were evaluated as described below. Table 6 shows the evaluation results.

Remanence (Br) and Coercive Force (iHc) of Magnetic Powder

Remanence, Coercive Force, and Orientation Ratio

The silane coupling-treated SmFeN-based magnetic powder obtained in Production Example 8 or Production Example 9 was packed together with a paraffin wax into a sample vessel. After the paraffin wax was melted using a dryer, the easy axes of magnetization were aligned in an orientation field of 2 T. The magnetically oriented sample was pulse magnetized in a magnetizing field of 6 T. and the magnetic properties (residual magnetization or, intrinsic coercive force iHc) of the sample were measured using a vibrating sample magnetometer (VSM, available from Riken Denshi Co., Ltd., Model: BHV-55) with a maximum field of 2 T. Table 1 shows the results. The remanence Br (unit: T) was calculated from the residual magnetization σr (unit: emu/g) by the equation:

$$Br = 4 \times \pi \times \rho \times \sigma r \text{ where } \rho \text{ (density)} = 7.66 \text{ g/cm}^3.$$

Amount of Attached PO$_4$

The P concentration in the phosphate-coated SmFeN-based anisotropic magnetic powder obtained in Production Example 8 or Production Example 9 was measured by an ICP atomic emission spectroscopy (ICP-AES) and converted into an amount of PO$_4$ molecule to determine the amount of attached PO$_4$. Table 6 shows the results.

Remanence (Br) and Coercive Force (iHc) of Bonded Magnet

The bonded magnets prepared in the examples and comparative examples were measured for remanence Br (T) and coercive force iHc (kA/m) using a BH tracer. The orientation ratio was calculated by the following equation:

$$\text{Orientation ratio (\%)} = Br(T) / [(\text{Volume filling ratio (vol \%) of SmFeN-based magnetic powder}) \div 100 \times (\text{Remanence (T) of silane coupling-treated SmFeN-based magnet powder})] \times 100.$$

improve the fluidity of a compound for bonded magnets and also to improve the remanence of a bonded magnet formed therefrom. The resulting bonded magnet may be suitably used as a composite material or bonded magnet in a motor or other applications.

What is claimed is:

1. A method of producing a compound for thermoplastic resin-containing bonded magnets, the method comprising:
   heat-curing a thermosetting resin and a curing agent having a ratio of a number of reactive groups of the curing agent to a number of reactive groups of the thermosetting resin of at least 2 but not higher than 11 to obtain an additive for thermoplastic resin-containing bonded magnets,
   wherein the additive for thermoplastic resin-containing bonded magnets is a cured product of the thermosetting resin and the curing agent; and
   kneading the additive for thermoplastic resin-containing bonded magnets, magnetic powder, and a thermoplastic resin to obtain the compound for thermoplastic resin-containing bonded magnets in which a filling ratio of the magnetic powder is at least 91.5% by mass.

2. The method of producing a compound for thermoplastic resin-containing bonded magnets according to claim 1, wherein the magnetic powder includes NdFeB-based magnetic powder and SmFeN-based anisotropic magnetic powder.

3. The method of producing a compound for thermoplastic resin-containing bonded magnets according to claim 1,

TABLE 6

| Example No. | Mixing method | Conditions for phosphate treatment pH adjustment during phosphate treatment | Amount (wt %) of attached PO$_4$ | Magnetic powder Br (T) | Magnetic powder iHc (kA/m) | Magnetic powder vol % | Magnetic powder wt % | Result of molding Br (T) | Result of molding iHc (kA/m) | Orientation ratio (%) | Injection pressure (MPa) |
|---|---|---|---|---|---|---|---|---|---|---|---|
| Example 17 | Powder mixing | Without pH adjustment (2.5-6) | 0.5 | 1.32 | 1432 | 61.7 | 92.2 | 0.81 | 1252 | 100 | 186 |
| Example 18 | Melt mixing | Without pH adjustment (2.5-6) | 0.5 | 1.32 | 1432 | 61.7 | 92.2 | 0.81 | 1350 | 100 | 144 |
| Example 19 | Melt mixing | Without pH adjustment (2.5-6) | 0.5 | 1.32 | 1432 | 63.4 | 92.69 | 0.82 | 1211 | 96.3 | 241 |
| Example 20 | Melt mixing | 2.5 | 1.1 | 1.3 | 1798 | 61.7 | 92.2 | 0.80 | 1607 | 100 | 115 |
| Example 21 | Melt mixing | 2.5 | 1.1 | 1.3 | 1798 | 63.4 | 92.69 | 0.81 | 1498 | 98.4 | 230 |
| Comparative Example 9 | PA alone | Without pH adjustment (2.5-6) | 0.5 | 1.32 | 1432 | 61.7 | 92.36 | 0.80 | 1067 | 98.0 | 235 |
| Comparative Example 10 | PA alone | Without pH adjustment (2.5-6) | 0.5 | 1.32 | 1432 | 63.4 | 92.85 | Unmoldable | | | |

As shown in Table 6, the injection pressure of each example was lower than that of the corresponding comparative example with the same volume filling ratio of the magnetic powder, demonstrating that the fluidity of the compounds for bonded magnets in the examples was improved. It was also demonstrated that as the compounds for bonded magnets had improved fluidity, the bonded magnets showed a higher coercive force.

The additive for bonded magnets according to an embodiment of the present disclosure may be used to greatly wherein the magnetic powder includes SmFeN-based anisotropic magnetic powder having a surface coated with a phosphate.

4. The method of producing a compound for thermoplastic resin-containing bonded magnets according to claim 1, wherein the kneading comprises:
   kneading the additive for thermoplastic resin-containing bonded magnets and a thermoplastic resin to obtain a resin composition for thermoplastic resin-containing bonded magnets; and kneading the resin composition for thermoplastic resin-containing bonded magnets and magnetic powder to obtain the compound for thermoplastic resin-containing bonded magnets.

5. The method of producing a compound for thermoplastic resin-containing bonded magnets according to claim 1, wherein the thermoplastic resin is a nylon resin.

6. The method of producing a compound for thermoplastic resin-containing bonded magnets according to claim 1, wherein the magnetic powder has a monodisperse particle size distribution.

7. The method of producing a compound for thermoplastic resin-containing bonded magnets according to claim 1, wherein the magnetic powder contains Sm, Fe, and N.

8. The method of producing a compound for thermoplastic resin-containing bonded magnets according to claim 1, wherein the compound for thermoplastic resin-containing bonded magnets comprises an organic pigment.

9. The method of producing a compound for thermoplastic resin-containing bonded magnets according to claim 1,
wherein the magnetic powder is phosphate-coated SmFeN-based anisotropic magnetic powder having a surface coated with a phosphate, and
the method further comprises performing a phosphate treatment comprising adding an inorganic acid to a slurry containing SmFeN-based anisotropic magnetic powder, water, and a phosphate compound so that the slurry is adjusted to have a pH of at least 1 but not higher than 4.5 to obtain the phosphate-coated SmFeN-based anisotropic magnetic powder.

10. The method of producing a compound for thermoplastic resin-containing bonded magnets according to claim 9,
wherein the phosphate-coated SmFeN-based anisotropic magnetic powder has a phosphate content of more than 0.5% by mass.

11. The method of producing a compound for thermoplastic resin-containing bonded magnets according to claim 9,
wherein, in the performing the phosphate treatment, the slurry is adjusted to have a pH of at least 1 but not higher than 4.5 for at least 10 minutes.

12. The method of producing a compound for thermoplastic resin-containing bonded magnets according to claim 9,
wherein, in the performing the phosphate treatment, the slurry is adjusted to have a pH of at least 1.6 but not higher than 3.9.

13. The method of producing a compound for thermoplastic resin-containing bonded magnets according to claim 9, further comprising
heat-treating the phosphate-coated SmFeN-based anisotropic magnetic powder at a temperature of at least 150° C. but not higher than 250° C. in an oxygen-containing atmosphere.

14. The method of producing a compound for thermoplastic resin-containing bonded magnets according to claim 9,
wherein the phosphate-coated SmFeN-based anisotropic magnetic powder has a DSC exothermic onset temperature of 170° C. or higher and a phosphate content of more than 0.5% by mass.

15. The method of producing a compound for thermoplastic resin-containing bonded magnets according to claim 9,
wherein the phosphate-coated SmFeN-based anisotropic magnetic powder has a XRD diffraction pattern in which a ratio (I)/(II) of a diffraction peak intensity (I) of a (110) plane of $\alpha$Fe to a peak intensity (II) of a (300) plane of the SmFeN-based magnetic powder is not higher than $2.0 \times 10^{-2}$.

16. The method of producing a compound for thermoplastic resin-containing bonded magnets according to claim 9,
wherein the phosphate-coated SmFeN-based anisotropic magnetic powder has a carbon content of not higher than 1,000 ppm.

17. A method of producing a thermoplastic resin-containing bonded magnet, the method comprising:
heat-curing a thermosetting resin and a curing agent having a ratio of a number of reactive groups of the curing agent to a number of reactive groups of the thermosetting resin of at least 2 but not higher than 11 to obtain an additive for thermoplastic resin-containing bonded magnets, wherein the additive for thermoplastic resin-containing bonded magnets is a cured product of the thermosetting resin and the curing agent;
kneading the additive for thermoplastic resin-containing bonded magnets, magnetic powder, and a thermoplastic resin to obtain a compound for thermoplastic resin-containing bonded magnets in which a filling ratio of the magnetic powder is at least 91.5% by mass; and
injection-molding the compound for thermoplastic resin-containing bonded magnets.

* * * * *